(12) United States Patent
Song et al.

(10) Patent No.: US 11,902,350 B2
(45) Date of Patent: Feb. 13, 2024

(54) VIDEO PROCESSING METHOD AND APPARATUS

(71) Applicant: Huawei Technologies Co., Ltd., Guangdong (CN)

(72) Inventors: Yi Song, Shenzhen (CN); Peiyun Di, Shenzhen (CN); Xuhong Zeng, Shenzhen (CN); Maozheng Liu, Shenzhen (CN); Jun Zha, Shenzhen (CN); Jiantong Zhou, Shenzhen (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 205 days.

(21) Appl. No.: 17/247,008

(22) Filed: Nov. 24, 2020

(65) Prior Publication Data
US 2021/0084096 A1    Mar. 18, 2021

Related U.S. Application Data

(63) Continuation of application No. PCT/CN2018/121694, filed on Dec. 18, 2018.

(30) Foreign Application Priority Data

May 30, 2018    (CN) .......................... 201810539735.X

(51) Int. Cl.
*H04L 65/80*    (2022.01)
*H04N 19/162*    (2014.01)
(Continued)

(52) U.S. Cl.
CPC .............. *H04L 65/80* (2013.01); *H04L 65/70* (2022.05); *H04N 19/162* (2014.11); *H04N 19/184* (2014.11); *H04N 19/70* (2014.11)

(58) Field of Classification Search
CPC ......... H04N 21/44008; H04N 21/4394; H04N 21/436; H03G 3/32; G06F 16/60
See application file for complete search history.

(56) References Cited

U.S. PATENT DOCUMENTS 9,430,954 B1 *  8/2016  Dewhurst ............ G09B 21/007
9,445,040 B2    9/2016  Watson
(Continued)

FOREIGN PATENT DOCUMENTS

CN       1060379 A    4/1992
CN     102458595 A    5/2012
(Continued)

OTHER PUBLICATIONS

Jeong Do Kim et al: Development of Scent Display and Its Authoring Tool ETRI Journal vol. 37 No. 1, Feb. 1, 2015, XP055754651, pp. 88-96.
(Continued)

*Primary Examiner* — Mahran Y Abu Roumi
(74) *Attorney, Agent, or Firm* — WOMBLE BOND DICKINSON (US) LLP

(57) ABSTRACT

This application provides a video processing method and apparatus. The method includes: adding, by a server, perception attribute information of an object and spatial location information of the object to a video bitstream or a video file, and encapsulating the video bitstream or the video file, where the perception attribute information is used to indicate a property presented when the object is perceived by a user; and obtaining, by a terminal device, the video bitstream or the video file that carries the perception attribute information of the object and the spatial location information of the object, and performing perception rendering on a perception attribute of the object based on behavior of the user, the
(Continued)

perception attribute information of the object and the spatial location information of the object.

24 Claims, 4 Drawing Sheets

(51) Int. Cl.
*H04N 19/184* (2014.01)
*H04N 19/70* (2014.01)
*H04L 65/70* (2022.01)

(56) References Cited

U.S. PATENT DOCUMENTS

| | | | |
|---|---|---|---|
| 11,210,516 B2* | 12/2021 | Xiang | G06T 7/246 |
| 2007/0126927 A1* | 6/2007 | Yun | H04N 21/23614 |
| | | | 348/473 |
| 2011/0160882 A1* | 6/2011 | Gupta | H04N 21/44008 |
| | | | 375/240.01 |
| 2014/0168145 A1 | 6/2014 | Reynolds | |
| 2014/0380380 A1 | 12/2014 | Heller et al. | |
| 2016/0231720 A1 | 8/2016 | Choi et al. | |
| 2016/0373745 A1* | 12/2016 | Joshi | H04N 19/13 |
| 2017/0017382 A1* | 1/2017 | Tobin | H04N 21/44226 |
| 2017/0047056 A1* | 2/2017 | Lee | G10H 1/0008 |
| 2017/0076499 A1 | 3/2017 | Jiang et al. | |
| 2017/0374294 A1 | 12/2017 | Osman | |
| 2018/0063574 A1* | 3/2018 | Stockhammer | H04N 21/44 |
| 2018/0308457 A1* | 10/2018 | Chauhan | G09G 5/391 |
| 2019/0019340 A1* | 1/2019 | Yun | G06T 15/20 |
| 2021/0287440 A1* | 9/2021 | Wang | G06F 3/011 |
| 2021/0346562 A1* | 11/2021 | Obrist | A61L 9/035 |

FOREIGN PATENT DOCUMENTS

| | | |
|---|---|---|
| CN | 103297591 A | 9/2013 |
| CN | 104025158 A | 9/2014 |
| CN | 106210743 A | 12/2016 |
| CN | 107710107 A | 2/2018 |
| CN | 107888939 A | 4/2018 |
| CN | 107896508 A | 4/2018 |
| CN | 107959861 A | 4/2018 |
| CN | 108833937 A | 11/2018 |
| IN | 107566911 A | 1/2018 |
| JP | 2016045814 A | 4/2016 |
| JP | 2017204273 A | 11/2017 |
| KR | 20110068885 A | 6/2011 |

OTHER PUBLICATIONS

Shen Zhipeng, Research on Multisensory Interactive Augmented Reality System Design and Its User Experience. Harbin Institute of Technology, 2015, 1 page.
Information technology Media context and control-Part 1: Architecture ISO/IEC 23005 1:2016 IEC 3 Jul. 15, 2016, pp. 1-55, XP082004462.
Zhao Qinping, Overview of Virtual Reality. Science in China(Series F:Information Sciences), 2009, 46 pages.
Jae Kwan Yun et al: WD 3 .0 of MPEG V Engines API , 107.MPEG Meeting; Jan. 13, 2014 Jan. 17, 2014, San Jose;(Motion Picture Expert Group or ISO/IEC JTC1/SC29/WG11), No. m32396, Jan. 12, 2014, XP030060848, 5 pages.
Jaeha Kim et al., Construction of a haptic-enabled broadcasting system based on the MPEG-V standard. SignalProcessing: Image Communication, vol. 28, Issue 2, Feb. 2013, pp. 151-161.
Jiyeon Kim et al: Proposal of 4D Media Application Format 100. MPEG Meeting;Apr. 30, 2012 May 4, 2012; Geneva;(Motion Picture Expert Group or ISO/IEC JTC1/SC29/WG11) No. m25061, Apr. 27, 2012 XP030273515 7 pages.
Presentation material of the MPEG V. Awareness Event , 95 .MPEG Meeting; Jan. 24, 2011-Jan. 28, 2011; Daegu; (Motion Picture Expert Group or ISO/IEC JTC1/SC29/WG11, No. n11852, Feb. 12, 2011, XP030274651, 50 pages.

* cited by examiner

300

A terminal device obtains a video bitstream or a video file, where the video bitstream or the video file carries perception attribute information of at least one object and spatial location information of the at least one object, the perception attribute information is used to indicate a property presented when the at least one object is perceived by a user, the video bitstream is generated after source video data is encoded, and the video file is used to describe a video attribute of the source video data ~ S310

The terminal device obtains perception attribute information of at least one target object and spatial location information of the at least one target object in the video bitstream or the video file, where the at least one object includes the at least one target object ~ S320

The terminal device performs perception rendering on a perception attribute of the at least one target object based on behavior of the user in combination with the perception attribute information of the at least one target object and the spatial location information of the at least one target object ~ S330

FIG. 3

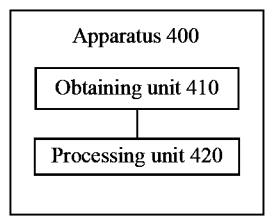

FIG. 4

VIDEO PROCESSING METHOD AND APPARATUS

CROSS-REFERENCE TO RELATED APPLICATIONS

This application is a continuation of International Application No. PCT/CN2018/121694, filed on Dec. 18, 2018, which claims priority to Chinese Patent Application No. 201810539735.X, filed on May 30, 2018, the disclosures of which are incorporated herein by reference in their entireties.

TECHNICAL FIELD

This application relates to the field of media transmission technologies, and more specifically, to a video processing method and apparatus.

BACKGROUND

Human body perception means a sense of a person about an external environment, such as a sense of vision, a sense of smell, a sense of hearing, and a sense of touch. When watching a normal video, a watcher is triggered by a terminal device to use only the sense of vision and the sense of hearing to perceive video content. For example, when watching a video, the watcher can see a video image on a screen and hear audio from a loudspeaker.

Another sense of a human body is triggered during video watching, such as the sense of smell or the sense of touch, and is used in some video applications currently. For example, there is a customized water spray system in some private cinemas. When some scenes such as raining in a being watched movie happen, the water spray system sprays water accordingly, to bring water mist experience to the watcher and trigger the sense of touch of the watcher. In addition, an existing olfactory information-based transmission method is mainly applied to a conventional signal transmission system. Within a particular period of time, a scent sensor is used to capture a scent at a current moment to generate a scent information code. Then, the bitstream is sent to a client, and the client decodes and processes the obtained scent information code to obtain scent information, and then emits a scent corresponding to the information.

In the foregoing method, signal encoding transmission is performed on all scents in only a current environment, and scent information is related to only an encoded time period. Therefore, in the method, the scent information cannot be associated with an object in a video or video content, and the watcher may accordingly smell a scent that is unrelated to watched video content. Consequently, different objects in the video cannot bring different perception to a user, affecting watching experience of the user.

SUMMARY

This application provides a video processing method and apparatus, so that a perception attribute of an object can be associated with a spatial location of the object in a video, to obtain better user experience.

According to a first aspect, a video processing method is provided, including: obtaining, by a server, source video data; determining, by the server, at least one object whose perception attribute information needs to be encoded in the source video data, where the perception attribute information is used to indicate a property presented when the at least one object is perceived by a user; obtaining, by the server, the perception attribute information of the at least one object and spatial location information of the at least one object; and adding, by the server, the perception attribute information and the spatial location information to a video bitstream generated after the source video data is encoded or a video file of the source video data, where the video file is used to describe a video attribute of the source video data.

In an embodiment, the perception attribute information is information indicating a perception attribute of an object, and is used to indicate a property presented when the object is perceived by the user, for example, a sense of smell or a sense of touch. The spatial location information is used to indicate a spatial location of the object in a video. A panoramic video is used as an example. The spatial location information of the object is three-dimensional location coordinates of the object in a coordinate system in which a perception attribute information capture apparatus is used as a sphere center, and may be obtained through calculation in combination with two-dimensional coordinates of the object in a latitude and longitude map and a distance between the object and the perception attribute capture apparatus. However, this is not limited in this embodiment of this application.

It should be understood that, when the perception attribute information and the spatial location information are carried in supplemental enhancement information SEI or a media file format, the spatial location information may further include two-dimensional location information of the object in an image, for example, the two-dimensional coordinates of the object in the latitude and longitude map.

In the video processing method in this embodiment of this application, a human body perception attribute other than a sense of vision and a sense of hearing is indicated in the video bitstream or the video file, and the perception attribute of the object is associated with the spatial location of the object, so that different objects in the video bring different perception to the user, thereby obtaining better user experience.

It should be understood that the video bitstream is a bitstream obtained after the server encodes the source video data, and may include a coding unit (CU), the supplemental enhancement information (SEI), and the like. The video file is all or some files used to describe the source video data (or further including the video bitstream), and may include the media file format, a media presentation description (MPD), and the like.

In an embodiment, the adding, by the server, the perception attribute information and the spatial location information to a video bitstream or a video file includes: determining, by the server, a syntax element of a target object in the at least one object, where the syntax element is used to indicate perception attribute information of the target object and spatial location information of the target object; and encoding, by the server, the syntax element into a coding unit CU syntax structure or SEI corresponding to the target object, to obtain the video bitstream.

In an embodiment, for a specific object in the at least one target object, a target object is used as an example. The server may determine perception attribute information and spatial location information of the target object, further determine a syntax element corresponding to the target object, and add the syntax element to a CU or SEI corresponding to the target object to perform encoding.

In this way, when decoding the video bitstream, the terminal device may obtain the perception attribute information and the spatial location information of the target object from the CU or the SEI corresponding to the target object, and further parse and render a perception attribute of the target object.

In an embodiment, the adding, by the server, the perception attribute information and the spatial location information to a video bitstream or a video file includes: determining, by the server, a syntax element of a target object in the at least one object, where the syntax element is used to indicate perception attribute information of the target object and spatial location information of the target object; and adding, by the server, the syntax element to a media file format or an MPD of the video file.

In an embodiment, for a specific object in the at least one target object, a target object is used as an example. The server may determine perception attribute information and spatial location information of the target object, further determine a syntax element corresponding to the target object, and add the syntax element to the media file format or the MPD. In this case, the corresponding video file may be encoded, or may not be encoded. This is not limited in this embodiment of this application.

In this way, when performing decoding, the terminal device may obtain the perception attribute information and the spatial location information of the target object from the media file format or the MPD of the video file, and further parse and render a perception attribute of the target object.

In an embodiment, the spatial location information of the at least one object includes a distance measurement value between the at least one object and the perception attribute information capture apparatus; and the perception attribute information of the at least one object includes at least one of the following information: a scent code of the at least one object, a maximum scent strength of the at least one object, a tactility code of the at least one object, and a maximum tactility strength of the at least one object, where the scent code is used to indicate a type of a scent emitted by the at least one object, and the tactility code is used to indicate a tactility type of the user when the at least one object is touched.

In an embodiment, the video bitstream or the video file includes a flag bit, and the flag bit is used to indicate whether the perception attribute information of the at least one object needs to be parsed.

In an embodiment, the video bitstream or the video file may further carry the flag bit used to indicate whether the perception attribute information of the at least one object needs to be parsed. The terminal device may determine, based on the flag bit, whether the perception attribute information in the video bitstream or the video file needs to be parsed.

In an embodiment, the flag bit is included in a header structure of the video bitstream; the flag bit is included in the perception attribute information of the video bitstream; or the flag bit is included in a box of the video file.

According to a second aspect, another video processing method is provided, including: obtaining, by a terminal device, a video bitstream or a video file, where the video bitstream or the video file carries perception attribute information of at least one object and spatial location information of the at least one object, the perception attribute information is used to indicate a property presented when the at least one object is perceived by a user, the video bitstream is generated after source video data is encoded, and the video file is used to describe a video attribute of the source video data; obtaining, by the terminal device, perception attribute information of at least one target object and spatial location information of the at least one target object in the video bitstream or the video file, where the at least one object includes the at least one target object; and performing, by the terminal device, perception rendering on a perception attribute of the at least one target object based on behavior of the user in combination with the perception attribute information of the at least one target object and the spatial location information of the at least one target object.

In an embodiment, the terminal device may obtain, from a server or a memory of the terminal device, the video bitstream or the video file that carries the perception attribute information and the spatial location information of the at least one object. The terminal device determines, from the at least one object, the at least one target object that currently needs to be parsed, obtains the perception attribute information and the spatial location information of the at least one target object, and performs rendering on the perception attribute of the at least one target object in combination with the behavior of the user.

It should be understood that the terminal device may obtain perception attribute information and spatial location information of all objects in the video bitstream or the video file, or may obtain perception attribute information and spatial location information of a target object only within a visual angle of the user based on the visual angle of the user. This is not limited in this embodiment of this application.

In an embodiment, the obtaining, by the terminal device, perception attribute information of at least one target object and spatial location information of the at least one target object in the video bitstream or the video file includes: decoding, by the terminal device, the video bitstream, and obtaining the perception attribute information of the at least one target object and the spatial location information of the at least one target object from a CU syntax structure or SEI corresponding to the at least one target object; or decapsulating, by the terminal device, the video file, and obtaining the perception attribute information of the at least one target object and the spatial location information of the at least one target object from a media file format or an MPD of the video file.

In an embodiment, the spatial location information of the at least one object includes a distance measurement value between the at least one object and a perception attribute information capture apparatus; and the perception attribute information of the at least one object includes at least one of the following information: a scent code of the at least one object, a maximum scent strength of the at least one object, a tactility code of the at least one object, and a maximum tactility strength of the at least one object, where the scent code is used to indicate a type of a scent emitted by the at least one object, and the tactility code is used to indicate a tactility type of the user when the at least one object is touched.

In an embodiment, the performing, by the terminal device, perception rendering on a perception attribute of the at least one target object based on behavior of the user in combination with the perception attribute information of the at least one target object and the spatial location information of the at least one target object includes: determining, by the terminal device, a scent strength value of a first target object at a current location of the user based on the current location of the user, spatial location information of the first target object in the at least one target object, and a maximum scent strength of the first target object; and emitting, by the terminal device, a scent corresponding to the scent strength value and a scent code of the first target object.

In an embodiment, the performing, by the terminal device, perception rendering on a perception attribute of the at least one target object based on behavior of the user in combination with the perception attribute information of the at least one target object and the spatial location information of the at least one target object includes: determining, by the terminal device, a touch strength value of a second target object at a touch point of the user based on a current location of the touch point of the user, spatial location information of the second target object in the at least one target object, and a maximum tactility strength of the second target object; and feeding back, by the terminal device, tactility perception corresponding to the touch strength value and a tactility code of the second target object to the user.

In an embodiment, the video bitstream or the video file includes a flag bit, and the flag bit is used to indicate whether the perception attribute information of the at least one object needs to be parsed; and before the terminal device obtains perception attribute information of at least one target object within a current visual angle of the user based on a visual angle of the user and the video bitstream or the video file, the method includes: determining, by the terminal device based on the flag bit, whether the perception attribute information of the at least one object needs to be parsed.

In an embodiment, the flag bit is included in a header structure of the video bitstream; the flag bit is included in the perception attribute information of the video bitstream; or the flag bit is included in a box of the video file.

According to a third aspect, a video processing apparatus is provided, configured to perform the method according to any one of the first aspect or the embodiments of the first aspect. In an embodiment, the apparatus includes a unit configured to perform the method according to any one of the first aspect or the embodiments of the first aspect.

According to a fourth aspect, another video processing apparatus is provided, configured to perform the method according to any one of the second aspect or the embodiments of the second aspect. In an embodiment, the apparatus includes a unit configured to perform the method according to any one of the second aspect or the embodiments of the second aspect.

According to a fifth aspect, an embodiment of this application provides another video processing apparatus, including a nonvolatile memory and a processor that are coupled to each other. The processor invokes program code stored in the memory to perform some or all steps in the method according to any one of the first aspect or the embodiments of the first aspect.

According to a sixth aspect, an embodiment of this application provides another video processing apparatus, including a nonvolatile memory and a processor that are coupled to each other. The processor invokes program code stored in the memory to perform some or all steps in the method according to any one of the second aspect or the embodiments of the second aspect.

According to a seventh aspect, a computer-readable storage medium is provided. The computer-readable storage medium stores instructions. When the instructions run on a computer, the computer is enabled to perform the method according to the first aspect.

According to an eighth aspect, a computer program product that includes instructions is provided. When the instructions are run on a computer, the computer is enabled to perform the method according to the first aspect.

It should be understood that for beneficial effects achieved in the second to the eighth aspects and the corresponding embodiments of this application, refer to beneficial effects achieved in the first aspect and the corresponding embodiments of this application. Details are not described again.

BRIEF DESCRIPTION OF DRAWINGS

FIG. 3 is a schematic flowchart of another video processing method according to an embodiment of this application;

FIG. 4 is a schematic block diagram of a video processing apparatus according to an embodiment of this application;

DESCRIPTION OF EMBODIMENTS

Figure 1:
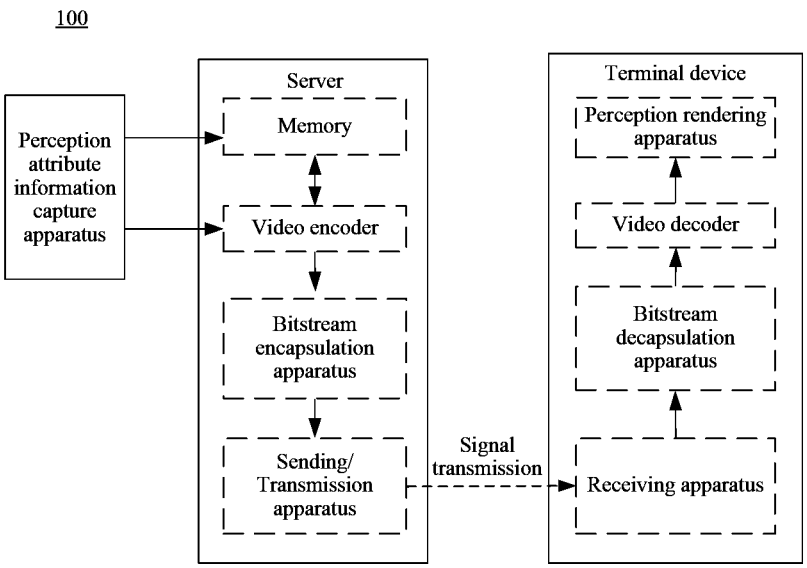
FIG. 1 is a schematic diagram of a possible application scenario according to an embodiment of this application.

The following describes technical solutions of this application with reference to accompanying drawings.

To better understand a video processing method in an embodiment of this application, the following first briefly describes some related basic concepts.

Human body perception: means a sense of a person about an external environment, such as a sense of vision, a sense of smell, a sense of hearing, and a sense of touch. When watching a normal video, a watcher is triggered by a terminal device to use only the sense of vision and the sense of hearing to perceive video content. For example, during video watching, a video image can be seen on a screen and audio can be heard from a loudspeaker. Another sense of a human body is triggered during video watching, such as the sense of smell or the sense of touch, and is used in some video applications. For example, there is a customized water spray system in some private cinemas. When some scenes such as raining in a being watched movie happen, the water spray system sprays water accordingly, to bring water mist experience to the watcher and trigger the sense of touch of the watcher.

In the foregoing application scenario, in a possible implementation, scene trigger information is encoded into a bitstream based on a moment at which an image of a specific scenario for raining appears in a video. When the video is played to a current moment, the scene information in the bitstream is decoded, and the water spray system is controlled to spray water, to trigger the sense of touch of the user.

Perception attribute of an object: means a property presented when the object is perceived by a human body, for example, an appearance (vision perception attribute), a scent (olfaction perception attribute), a sound (auditory perception attribute), and a touch (tactility perception attribute).

Panoramic video: means a virtual reality (VR) panoramic video in this specification, and is also referred to as a 360-degree panoramic video or a 360-degree video, which is a video that is photographed by using a plurality of cameras in a full 360-degree manner. When watching the video, a user can randomly adjust the video in all directions for watching. An image signal of the video may be virtualized as a spherical signal. However, a virtual spherical image signal cannot be visually seen by human eyes. Therefore, a three-dimensional spherical image signal needs to be indicated as a two-dimensional planar image signal. A most commonly used visual image format is a latitude and longitude map. A manner of collecting the image is evenly sampling a spherical image signal in a horizontal direction based on a longitude angle, and evenly sampling the spherical image signal in a vertical direction based on a latitude angle, so as to obtain a two-dimensional mapping image.

It should be understood that in a panoramic video application, the user may watch the video in different visual angle directions according to an idea of the user, and currently seen video content is related to a visual angle direction of the user. When rendering the video, the terminal device renders a part of a spherical video for watching of the user based on a visual angle direction.

3D panoramic video: means a VR panoramic video in a 3D format in this specification. The video includes two 360-degree panoramic videos. One is used for display in the left eye, and the other is used for display in the right eye. Content displayed in the left eye and content displayed in the right eye in the two videos are slightly different in a same frame, so that a 3D effect occurs when the user watches the video.

Latitude and longitude map: is a type of panoramic image format, and is a two-dimensional panoramic image that can be used for storage and transmission and that is obtained by evenly sampling and mapping a spherical signal based on latitude and longitude. Horizontal coordinates and vertical coordinates of the image can be indicated by latitude and longitude. A width direction may be indicated by longitude with a span of 360°, and a height direction may be indicated by latitude with a span of 180°.

Video decoding: Video decoding is a processing process of restoring a video bitstream to a reconstructed image according to a specific syntax rule and a processing method.

Video encoding: Video encoding is a processing process of compressing an image sequence into a bitstream.

Video coding: Video coding is a general term for video encoding and video decoding. For ease of distinguishing, video encoding and video decoding are collectively referred to as video processing in this specification.

Coding unit (CU): CU generally corresponds to a rectangular image area of A×B, and includes A×B luminance pixels and chrominance pixels corresponding to the A×B luminance pixels. A is a width of a rectangle, B is a height of the rectangle, A and B may be the same or different, and values of A and B are usually 2 raised to the power of an integer, for example, 256, 128, 64, 32, 16, 8, and 4. One coding unit may be decoded to obtain a reconstructed image of the rectangular area of A×B through decoding processing. The decoding processing usually includes processing such as prediction, dequantization, and inverse transformation, so as to generate a prediction image and a residual, and the prediction image and the residual are superposed to obtain the reconstructed image.

Sample: Sample is defined in the standard ISO/IEC 14496-12 as "all the data associated with a single timestamp", translated as "all the data associated with a single timestamp", and usually means a frame of data of a video, a series of video frames arranged in decoding order, or audio compression segments arranged in decoding order.

Track: Track is defined in the standard ISO/IEC 14496-12 as a "timed sequence of related samples (q.v.) in an ISO base media file. NOTE: For media data, a track corresponds to a sequence of images or sampled audio; for hint tracks, a track corresponds to a streaming channel", translated as a "timed sequence of related samples (q.v.) in an ISO base media file. NOTE: For media data, a track corresponds to a sequence of images or sampled audio; for hint tracks, a track corresponds to a streaming channel". In an embodiment, the track means a series of samples that have a time attribute and that are encapsulated in an ISO base media file format (ISOBMFF), for example, a video track, a video sample is a bitstream generated after a video encoder encodes each frame, and all video samples are encapsulated according to the ISOBMFF specification to generate a sample.

Box: Box is defined in the standard ISO/IEC 14496-12 as an "object-oriented building block defined by a unique type identifier and length. NOTE: Called 'atom' in some embodiments, including the first definition of MP4", translated as an "object-oriented building block defined by a unique type identifier and length. NOTE: Called 'atom' in some embodiments, including the first definition of MP4", the box is a basic unit that constitutes an ISOBMFF file, and the box may include another box.

Supplemental enhancement information (SEI): SEI is a type of a network access unit (network abstract layer unit (NALU)) defined in video encoding and decoding standards (h.264 and h.265).

Video file: Video file is used to describe a video attribute of source video data. The video attribute may be a width and a height of each frame of image of the source video data, a format of the source video data, and the like. The video file may include a media presentation description and a media file format, and may further include another file. This is not limited in this embodiment of this application.

Media presentation description (MPD): MPD is a document specified in the standard ISO/IEC 23009-1, and the document includes metadata used by a client to construct an HTTP-URL. The MPD includes one or more period elements, each period element includes one or more adaptation sets, each adaptation set includes one or more representations, and each representation includes one or more segments. The client selects a representation based on information in the MPD and constructs a segmented HTTP-URL.

Media file format: Media file format includes a series of boxes. A box may include another box. These boxes include a metadata box and a media data box. The metadata box (moov box) includes metadata, and the media data box (mdat box) includes media data. The metadata box and the media data box may be in a same file, or may be in separate files. The media file format may include the ISO base media file format (ISOBMFF), and may further include another type of media file format.

An existing olfactory information-based transmission method is mainly applied to a conventional signal transmission system. Within a particular period of time, a scent sensor is used to capture a scent at a current moment to generate a scent information code. Then, the bitstream is sent to the client, and the client decodes and processes the obtained scent information code to obtain scent information, and then emits a scent corresponding to the information.

In the foregoing method, signal encoding transmission is performed on all scents in only a current environment, and scent information is related to only an encoded time period, but is unrelated to an object location in video content. Therefore, in the method, the scent information cannot be associated with an object in a video or the video content, and a watcher may accordingly smell a scent that is unrelated to watched video content. Consequently, watching experience of the user is affected. Particularly, when there is three-dimensional space information in a watched video, such as the panoramic video, this technology cannot enable different objects or content in the video to bring different perception to the user, severely affecting immersive experience brought by the panoramic video.

In view of this, this application provides a new video processing method. A human body perception attribute other than a sense of vision and a sense of hearing is indicated in a video bitstream or a video file, and a perception attribute of an object is associated with a spatial location of the object in a video, so that different objects in the video bring different perception to a user, thereby obtaining better user experience.

FIG. 1 is a schematic diagram of a possible application scenario according to an embodiment of this application.

As shown in FIG. 1, an application scenario 100 includes a perception attribute information capture apparatus, a server, and a terminal device. The perception attribute information capture apparatus is configured to capture perception attribute information, and generate source video data, and may include a camera, a sensor, and the like. The server obtains the source video data from the perception attribute information capture apparatus, and encodes the source video data to obtain a to-be-transmitted or to-be-stored video bitstream. The terminal device may obtain the video bitstream from the server, and decode the video bitstream.

In an embodiment, the perception attribute information capture apparatus may include an apparatus related to human body perception information capture, such as a video capture apparatus, an audio capture apparatus, a scent capture apparatus, and a tactility sensing apparatus. The server may include a memory, a video encoder, a bitstream encapsulation apparatus, and a sending/transmission apparatus. The terminal device may include a receiving apparatus, a bitstream decapsulation apparatus, a video decoder, and a perception rendering apparatus.

In an embodiment, the video encoder may include a perception attribute information encoder, configured to encode the perception attribute information, and the video decoder may include a perception attribute information decoder, configured to decode the perception attribute information. In this way, independent encoding and decoding of the perception attribute information of an object and encoded source video data can be implemented.

In an embodiment, the perception attribute information capture apparatus may send the captured source video data to the server. The server may store the source video data in the memory, or may directly encode the source video data by using the video encoder, encapsulate encoded video bitstream by using the bitstream encapsulation apparatus, and then send an encapsulated video bitstream to the memory or the sending/transmission apparatus. It should be understood that the server may store the encapsulated video bitstream on the server, or may proactively transmit the encapsulated video bitstream to the terminal device by using the sending/transmission apparatus. This is not limited in this embodiment of this application. The terminal device receives the encapsulated video bitstream by using the receiving apparatus, decapsulates the video bitstream by using the bitstream decapsulation apparatus, decodes the video bitstream by using the video decoder, and finally performs perception rendering on the perception attribute information in the bitstream by using the perception rendering apparatus. It should be understood that the perception rendering apparatus is an apparatus for restoring and reproducing decoded perception attribute information, and may include an audio and video play apparatus, a scent emission apparatus, a tactility simulation apparatus, and the like.

It should be further understood that the server may be an encoder side device, and the encoder side device herein may be a video encoder, a device with a video encoding function, or the like. The terminal device may be a decoder side device, and the decoder side device herein may be a video decoder, a device with a video decoding function, a video player (for example, an electronic device capable of processing multimedia data), or the like. This is not limited in this embodiment of this application. Specific product forms of the server and the terminal device may include a computer, a mobile device (such as a mobile phone or a tablet computer), a wearable device, and the like. This is not limited in this embodiment of this application.

Figure 2:
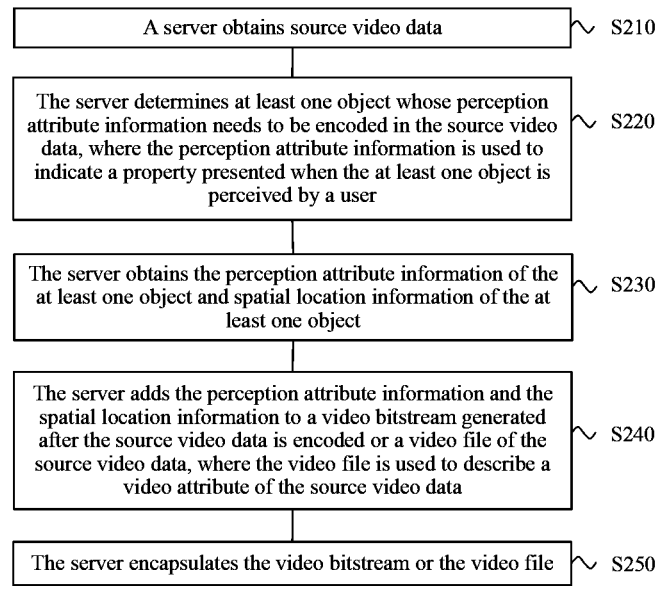
FIG. 2 is a schematic flowchart of a video processing method according to an embodiment of this application.

FIG. 2 is a schematic flowchart of a video processing method according to an embodiment of this application. The method shown in FIG. 2 may be applied to the foregoing application scenario 100, and the method 200 may be performed by the foregoing server. However, this embodiment of this application is not limited thereto.

S210. A server obtains source video data.

S220. The server determines at least one object whose perception attribute information needs to be encoded in the source video data, where the perception attribute information is used to indicate a property presented when the at least one object is perceived by a user.

S230. The server obtains the perception attribute information of the at least one object and spatial location information of the at least one object.

S240. The server adds the perception attribute information and the spatial location information to a video bitstream generated after the source video data is encoded or a video file of the source video data, where the video file is used to describe a video attribute of the source video data.

S250. The server encapsulates the video bitstream or the video file.

In an embodiment, the server may obtain the source video data from a perception attribute information capture apparatus, and determine the at least one object whose perception attribute information needs to be encoded in the source video data. The server obtains the perception attribute information and the spatial location information of the at least one object from the perception attribute information capture apparatus. The perception attribute information is information indicating a perception attribute of an object, and is used to indicate a property presented when the object is perceived by the user, for example, a sense of smell or a sense of touch. The spatial location information is used to indicate a spatial location of the object in a video. A panoramic video is used as an example. The spatial location information of the object is three-dimensional location coordinates of the object in a coordinate system in which the perception attribute information capture apparatus is used as a sphere center, and may be obtained through calculation in combination with two-dimensional coordinates of the object in a latitude and longitude map and a distance between the object and the perception attribute capture apparatus. However, this is not limited in this embodiment of this application.

It should be understood that, when the perception attribute information and the spatial location information are carried in SEI or a media file format, the spatial location information may further include two-dimensional location information of the object in an image, for example, the two-dimensional coordinates of the object in the latitude and longitude map.

After obtaining the perception attribute information and the spatial location information of the object whose perception attribute needs to be encoded, the server associates the perception attribute information of the object with the corresponding spatial location information, adds the perception attribute information and the corresponding spatial location information to the video bitstream or the video file corresponding to the source video data, and then encapsulates the video bitstream or the video file that carries the perception attribute information and the spatial location information.

Therefore, in the video processing method in this embodiment of this application, a human body perception attribute other than a sense of vision and a sense of hearing is indicated in the video bitstream or the video file, and the perception attribute of the object is associated with the spatial location of the object, so that different objects in the video bring different perception to the user, thereby obtaining better user experience.

It should be understood that the video bitstream is a bitstream obtained after the server encodes the source video data, and may include a CU, the SEI, and the like. The video file is all or some files used to describe the video bitstream, and may include the media file format, an MPD, and the like.

It should be further understood that after encapsulating the video bitstream or the video file that carries the perception attribute information and the spatial location information, the server may first store an encapsulated video bitstream or an encapsulated video file, and then send the encapsulated video bitstream or the encapsulated video file to the terminal device when the terminal device makes a request, or may directly send the encapsulated video bitstream or the encapsulated video file to the terminal device. This is not limited in this embodiment of this application.

FIG. 3 is a schematic flowchart of a video processing method according to an embodiment of this application. The method shown in FIG. 3 may be applied to the foregoing application scenario 100, and the method 300 may be performed by the foregoing terminal device. However, this embodiment of this application is not limited thereto.

S310. A terminal device obtains a video bitstream or a video file, where the video bitstream or the video file carries perception attribute information of at least one object and spatial location information of the at least one object, the perception attribute information is used to indicate a property presented when the at least one object is perceived by a user, the video bitstream is generated after source video data is encoded, and the video file is used to describe a video attribute of the source video data.

S320. The terminal device obtains perception attribute information of at least one target object and spatial location information of the at least one target object in the video bitstream or the video file, where the at least one object includes the at least one target object.

S330. The terminal device performs perception rendering on a perception attribute of the at least one target object based on behavior of the user in combination with the perception attribute information of the at least one target object and the spatial location information of the at least one target object.

In an embodiment, the terminal device may obtain, from a server or a memory of the terminal device, the video bitstream or the video file that carries the perception attribute information and the spatial location information of the at least one object. The terminal device determines, from the at least one object, the at least one target object that currently needs to be parsed, obtains the perception attribute information and the spatial location information of the at least one target object, and performs rendering on the perception attribute of the at least one target object in combination with the behavior of the user.

It should be understood that the terminal device may obtain perception attribute information and spatial location information of all objects in the video bitstream or the video file, or may obtain perception attribute information and spatial location information of a target object only within a visual angle of the user based on the visual angle of the user. This is not limited in this embodiment of this application.

In the video processing method in this embodiment of this application, a human body perception attribute other than a sense of vision and a sense of hearing is indicated in the video bitstream or the video file, and a perception attribute of an object is associated with a spatial location of the object in a video, so that different objects in the video bring different perception to the user, thereby obtaining better user experience.

In an embodiment, that the server adds the perception attribute information and the spatial location information to a video bitstream or a video file includes:

determining, by the server, a syntax element of a target object in the at least one object, where the syntax element is used to indicate perception attribute information of the target object and spatial location information of the target object; and encoding, by the server, the syntax element into a CU syntax structure or SEI corresponding to the target object, to obtain the video bitstream.

Correspondingly, that the terminal device obtains perception attribute information of at least one target object and spatial location information of the at least one target object in the video bitstream or the video file includes:

decoding, by the terminal device, the video bitstream, and obtaining the perception attribute information of the at least one target object and the spatial location information of the at least one target object from a CU syntax structure or SEI corresponding to the at least one target object.

In an embodiment, a specific target object in the at least one target object is used as an example. The server may determine perception attribute information and spatial location information of the target object, further determine a syntax element corresponding to the target object, and add the syntax element to a CU or SEI corresponding to the target object to perform encoding.

In this way, when decoding the video bitstream, the terminal device may obtain the perception attribute information and the spatial location information of the target object from the CU or the SEI corresponding to the target object, and further parse and render a perception attribute of the target object.

In an embodiment, that the server adds the perception attribute information and the spatial location information to a video bitstream or a video file includes:

determining, by the server, a syntax element of a target object in the at least one object, where the syntax element is used to indicate perception attribute information of the target object and spatial location information of the target object; and adding, by the server, the syntax element to a media file format or an MPD of the video file.

Correspondingly, that the terminal device obtains perception attribute information of at least one target object and spatial location information of the at least one target object in the video bitstream or the video file includes:

decapsulating, by the terminal device, the video file, and obtaining the perception attribute information of the at least one target object and the spatial location information of the at least one target object from a media file format or an MPD of the video file.

In an embodiment, for a specific object in the at least one target object, a target object is used as an example. The server may determine perception attribute information and spatial location information of the target object, further determine a syntax element corresponding to the target object, and add the syntax element to the media file format or the MPD. In this case, the corresponding video file may be encoded, or may not be encoded. This is not limited in this embodiment of this application.

In this way, when performing decoding, the terminal device may obtain the perception attribute information and the spatial location information of the target object from the media file format or the MPD of the video file, and further parse and render a perception attribute of the target object.

In an embodiment, the spatial location information of the at least one object includes a distance measurement value between the at least one object and a perception attribute information capture apparatus; and the perception attribute information of the at least one object includes at least one of the following information:

a scent code of the at least one object, a maximum scent strength of the at least one object, a tactility code of the at least one object, and a maximum tactility strength of the at least one object, where the scent code is used to indicate a type of a scent emitted by the at least one object, and the tactility code is used to indicate a tactility type of the user when the at least one object is touched.

In an embodiment, the spatial location information may include the distance measurement value between the object and the perception information capture apparatus, and in addition to this, may further include two-dimensional coordinates of the object in a latitude and longitude map. The terminal device may obtain, through calculation in combination with the two-dimensional coordinates and the distance measurement value, three-dimensional location coordinates of the object in a coordinate system in which the perception attribute information capture apparatus is used as a sphere center. The perception attribute information includes olfaction perception attribute information and tactility perception attribute information, and may include a scent code of the object, a maximum scent strength of the object, a tactility code of the object, a maximum tactility strength of the object, and the like. However, this is not limited in this embodiment of this application.

In an embodiment, that the terminal device performs perception rendering on a perception attribute of the at least one target object based on behavior of the user in combination with the perception attribute information of the at least one target object and the spatial location information of the at least one target object includes:

determining, by the terminal device, a scent strength value of a first target object at a current location of the user based on the current location of the user, spatial location information of the first target object in the at least one target object, and a maximum scent strength of the first target object; and emitting, by the terminal device, a scent corresponding to the scent strength value and a scent code of the first target object.

When the perception attribute information includes olfaction perception attribute information, the first target object is used as an example, and the terminal device may first calculate three-dimensional location coordinates of the first target object, then calculate a distance between the first target object and the user in combination with the three-dimensional location coordinates of the first target object and the current location of the user, and calculate the scent strength value of the first target object at the current location of the user in combination with the distance and the maximum scent strength of the first target object. The terminal device may emit, based on the scent code of the first target object, the scent corresponding to the scent code and the scent strength value.

In an embodiment, that the terminal device performs perception rendering on a perception attribute of the at least one target object based on behavior of the user in combination with the perception attribute information of the at least one target object and the spatial location information of the at least one target object includes:

determining, by the terminal device, a touch strength value of a second target object at a touch point of the user based on a current location of the touch point of the user, spatial location information of the second target object in the at least one target object, and a maximum tactility strength of the second target object; and feeding back, by the terminal device, tactility perception corresponding to the touch strength value and a tactility code of the second target object to the user.

Likewise, when the perception attribute information includes tactility perception attribute information, the second target object is used as an example, and the terminal device may first calculate three-dimensional location coordinates of the second target object, then calculate a distance between the second target object and the user in combination with the three-dimensional location coordinates of the second target object and the current location of the user, and calculate the touch strength value of the second target object at the current location of the user in combination with the distance and the maximum tactility strength of the second target object. The terminal device may feed back, based on the tactility code of the second target object, tactility corresponding to the tactility code and the touch strength value to the user.

In an embodiment, the video bitstream or the video file includes a flag bit, and the flag bit is used to indicate whether the perception attribute information of the at least one object needs to be parsed; and before the terminal device obtains perception attribute information of at least one target object within a current visual angle of the user based on a visual angle of the user and the video bitstream or the video file, the method includes:

determining, by the terminal device based on the flag bit, whether the perception attribute information of the at least one object needs to be parsed.

In an embodiment, the video bitstream or the video file may further carry the flag bit used to indicate whether the perception attribute information of the at least one object needs to be parsed. The terminal device may determine, based on the flag bit, whether the perception attribute information in the video bitstream or the video file needs to be parsed.

In an embodiment, the flag bit is included in a header structure of the video bitstream;

the flag bit is included in the perception attribute information of the video bitstream; or the flag bit is included in a box of the video file.

For ease of understanding, the following details this application with reference to specific embodiments.

Embodiment 1: Perception Attribute Information is Carried in a Video Bitstream

Server Side

Step 1: A server obtains panoramic source video data captured by a video capture apparatus, and for an object whose perception attribute needs to be encoded in a scene, obtains perception attribute information of the object captured by the video capture apparatus and spatial location information of the object. It should be understood that the object whose perception attribute needs to be encoded in a video is usually preconfigured.

In an embodiment, in this embodiment of this application, a scent capture apparatus and/or a tactility sensing apparatus may be placed on the object to capture the perception attribute of the object, and in addition, spatial location information of each object relative to the scent capture apparatus and/or the tactility sensing apparatus is obtained.

Step 2: Encode the source video data, and simultaneously encode the perception attribute information and the spatial location information of the object in the video into a video bitstream. In an embodiment, for a specific object, a location or an image block corresponding to the object in the video may be obtained by using the spatial location information of the object obtained in step 1. When the corresponding location or the corresponding image block is encoded, perception attribute information of the object is simultaneously encoded into the video bitstream.

In an example encoding scheme, a syntax element indicating the perception attribute is encoded into an image coding unit syntax structure, as shown in Table 1 and Table 2.

TABLE 1

| Coding unit syntax structure coding_unit( ) | |
|---|---|
| coding_unit(x0, y0, log2CbSize) { | Descriptor |
|     if(transquant_bypass_enabled_flag) | |
|         cu_transquant_bypass_flag | ae(v) |
|     if(slice_type != I) | |
|         cu_skip_flag[x0][y0] | ae(v) |
|     nCbS = (1 << log2CbSize) | |
|     if(cu_skip_flag[x0][y0]) | |
|         prediction_unit(x0, y0, nCbS, nCbS) | |
|     else { | |
|         ... | |
|     } | |
|     cu_sensation_info(x0, y0) | |
| } | |

TABLE 2

| Coding unit perception attribute syntax structure cu_sensation_info( ) | |
|---|---|
| cu_sensation_info(x0, y0) { | Descriptor |
|     object_distance[x0][y0] | |
|     scent_code[x0][y0] | |
|     scent_maximum_strength[x0][y0] | |
|     tactility_code[x0][y0] | |
|     tactility_maximum_strength[x0][y0] | |
| } | |

A newly added syntax structure about the perception attribute information of the object is cu_sensation_info( ) and a perception attribute syntax element of an object and semantic interpretation that are included in the syntax structure are as follows:

object_distance[x0][y0]: indicates a distance measurement value between an object in a CU at an image coordinate point (x0, y0) and the video capture apparatus during photographing, that is, a distance measurement value between the object and a panoramic sphere center. A default measurement unit may be a standard international measurement unit meter (m)/kilometer (km). The coordinate point (x0, y0) is coordinates of an upper left corner of a luminance pixel block of the CU relative to coordinates of an upper left corner of an image luminance sample.

scent_code[x0][y0]: indicates a scent code of the object in the CU at the image coordinate point (x0, y0). A value of the scent code may be a numerical value 0, 1, 2, . . . , which separately indicates different scents emitted by different objects. The value is related to a material and a structure of the object.

scent_maximum_strength[x0][y0]: indicates a maximum strength of a scent emitted by the object in the CU at the image coordinate point (x0, y0).

tactility_code[x0][y0]: indicates a tactility code of the object in the CU at the image coordinate point (x0, y0). A value of the tactility code may be a numerical value 0, 1, 2, . . . , which separately indicates different tactility types of a human body when different objects are touched.

tactility_maximum_strength[x0][y0]: indicates a maximum tactility strength of the object in the CU at the image coordinate point (x0, y0).

Step 3: The server sends the video bitstream to an encapsulator to perform encapsulation that meets a transmission requirement, and stores an encapsulated video bitstream on the server. Alternatively, after encapsulating the video bitstream, the server sends an encapsulated video bitstream to a terminal device by using a sending/transmission apparatus.

Terminal Device Side

Step 1: A terminal device obtains an encapsulated video bitstream, where the video bitstream carries perception attribute information and spatial location information of an object.

In an embodiment, the terminal device may request, from a server, the video bitstream that carries the perception attribute information and the spatial location information of the object; or the terminal device may directly receive the video bitstream sent by a server; or the terminal device stores the video bitstream and obtains the video bitstream from a memory. This is not limited in this embodiment of this application.

Step 2: The terminal device sends the encapsulated video bitstream to a bitstream decapsulation apparatus for decapsulation, and the bitstream decapsulation apparatus outputs a video bitstream that is suitable for decoding of a video decoder.

Step 3: The terminal device decodes the video bitstream, and obtains a perception attribute of the object and the spatial location information of the object in the bitstream. The terminal device (e.g., a video player) may perform rendering on the video based on a visual angle of a user and behavior of the user, and perform perception information rendering on the perception attribute of the object based on the spatial location information of the object.

In an embodiment, a decoding and rendering process of the terminal device for the video bitstream obtained by the server by using a perception information encoding scheme is as follows:

1. Parse all CUs in the video bitstream to obtain a vector variable value of a perception attribute syntax element of an object in each CU, which may include the foregoing object_distance, scent_code, scent_maximum_strength, tactility_code, and tactility_maximum_strength.

2. Obtain, based on the visual angle of the user, video content that needs to be rendered within a current visual angle of the user, calculate a location and a range of the video content in a video image within the current visual angle of the user, and obtain perception attribute values of all objects located within the current visual angle of the user, that is, the vector variable value of the perception attribute syntax element of the object.

In an embodiment, the terminal device may parse, based on the visual angle of the user, only a CU syntax element in a video corresponding to the current visual angle of the user, and may directly obtain the perception attribute values of all the objects located within the current visual angle of the user. A manner in which the terminal device obtains the vector variable value of the perception attribute syntax element of each object in the required CU is not limited in this embodiment of this application.

3. Perform rendering on a perception attribute of an object based on the behavior of the user.

For olfaction information rendering, in an embodiment, a method is as follows: When the user sees a particular object within the visual angle, three-dimensional location coordinates (x1, y1, z1) of the object in a coordinate system in which a video capture apparatus is used as a sphere center may be obtained through calculation based on distance information object_distance (indicated by a variable d) of the object and location information (x0, y0) of the object in the video. For example, the video is indicated in a format of a latitude and longitude map, a longitude range is [−180°, 180°], a coordinate axis direction is from left to right, a latitude range is [−90°, 90°], and a coordinate axis direction is from bottom to top. Therefore, a longitude angle ion and a latitude angle lat of the object may be calculated based on the location information:

$$\begin{cases} lon = \dfrac{2\pi \cdot x0}{w} - \pi \\ lat = \dfrac{\pi}{2} - \dfrac{\pi \cdot y0}{h} \end{cases},$$

where w and h are respectively a width and a height of the latitude and longitude map. Therefore, the terminal device may obtain coordinate values of the object as follows:

$$\begin{cases} x1 = d \cdot \cos(lat) \cdot \sin(lon) \\ y1 = d \cdot \cos(lat) \cdot \cos(lon) \\ \quad z1 = d \cdot \sin(lat) \end{cases}$$

Then, the terminal device may calculate a distance between the user and the object based on a coordinate location (x2, y2, z2) of the user in the coordinate system in the video, and calculate, based on the distance value and a maximum scent strength value scent_maximum_strength of the object, a strength value of the scent-emitting object at the user location (x2, y2, z2). A strength value calculation manner may be as follows:

$$S = \dfrac{scent\_max\_strength}{d},$$

where

S is the strength value of the object at the user location.

When obtaining the strength value, a scent rendering apparatus may emit a scent for rendering in combination with the scent code scent_code. In this case, the user may smell the scent emitted by the object.

Similarly, for tactility information rendering, in an embodiment, a method is as follows: When the user interacts with an object in the video, for example, performs a touch operation, the player obtains three-dimensional coordinates (x0, y0, z0) of a human body touch point, determines a touch relationship between the user and the object in combination with three-dimensional location coordinates (x1, y1, z1) of an object touch point in the coordinate system, and calculates a touch strength of the object based on a maximum tactility strength value tactility_maximum_strength of the object. Finally, the terminal device may enable a tactility rendering apparatus to render tactility perception in combination with the touch strength and the tactility code tactility_code, and in this case, the user can feel corresponding tactility.

In an embodiment, the video bitstream may include a flag bit, used to indicate whether the perception attribute information of the object in the video bitstream needs to be parsed. The flag bit may be indicated in a plurality of forms, and may be classified into the following several cases.

Case 1: A flag bit perception_enable_flag is added to a header structure of a bitstream, to control whether a perception attribute of an object needs to be parsed in the bitstream.

In an embodiment, the header structure may be a video parameter set (VPS), a sequence parameter set (SPS), a picture parameter set (PPS), a slice header, a slice segment header, or the like. This is not limited in this embodiment of this application. The server and the terminal device may agree on a meaning of the flag bit in advance, and the terminal device interprets the flag bit based on the agreed meaning.

In an embodiment, if the SPS and the PPS each include the flag bit but the flag bit in the SPS is different from the flag bit in the PPS, the flag bit in the PPS is valid, and the flag bit in the SPS is invalid. If the SPS and the slice header each include the flag bit but the flag bit in the SPS is different from the flag bit in the slice header, the flag bit in the slice header is valid, and the flag bit in the SPS is invalid. If the PPS and the slice header each include the flag bit but the flag bit in the PPS is different from the flag bit in the slice header, the flag bit in the slice header is valid, and the flag bit in the PPS is invalid. If syntax structures of a plurality of levels each include the flag bit but the flag bits are different, the flag bit in a syntax structure of a lowest level is valid, and the flag bit in a syntax structure of an upper level is invalid.

When the flag bit is valid, and perception_enable_flag is a first value (for example, 1), it indicates that an object perception attribute switch related to perception_enable_flag is enabled, and a corresponding object perception attribute may be parsed; or when perception_enable_flag is a second value (for example, 0), it indicates that an object perception attribute switch related to perception_enable_flag is disabled, and a corresponding object perception attribute cannot be parsed.

In this case, a coding unit syntax structure coding_unit( ) may be shown in Table 3.

TABLE 3

| Coding unit syntax structure coding_unit( ) | |
|---|---|
| coding_unit(x0, y0, log2CbSize) { | Descriptor |
|   if(transquant_bypass_enabled_flag) | |
|     cu_transquant_bypass_flag | ae(v) |
|   if(slice_type != I) | |
|     cu_skip_flag[x0][y0] | ae(v) |
|   nCbS = (1 << log2CbSize) | |

TABLE 3-continued

Coding unit syntax structure coding_unit( )

| coding_unit(x0, y0, log2CbSize) { | Descriptor |
|---|---|
| if(cu_skip_flag[x0][y0]) | |
| prediction_unit(x0, y0, nCbS, nCbS) | |
| else { | |
| ... | |
| } | |
| if(perception_enable_flag) { | |
| cu_sensation_info(x0, y0) | |
| } | |
| } | |

A coding unit perception attribute syntax structure cu_sensation_info( ) is still shown in Table 2, and details are not described herein again.

In this case, in a decoding process, the terminal device may first parse the flag bit perception_enable_flag, and then determine, based on a value of perception_enable_flag, that an object perception attribute identified in the CU needs to be parsed (perception_enable_flag is the first value) or does not need to be parsed (perception_enable_flag is the second value). If the perception attribute information is not to be parsed or fails to be parsed, the player does not perform perception rendering.

In Case 1, the flag bit may be alternatively added to a header structure of the video bitstream, to control whether different perception attribute information of the object needs to be parsed in the video bitstream.

In an embodiment, for olfaction perception attribute information and tactility perception attribute information, flag bits scent_perception_enable_flag and tactilit_perception_enable_flag both may be added to the header structure of the video bitstream. Similarly, these flag bits may be located in the VPS, the SPS, the PPS, the slice header, or the slice segment header.

For a specific flag bit, if the VPS and the PPS each include the flag bit but the flag bit in the VPS is different from the flag bit in the PPS, the flag bit in the VPS is valid, and the flag bit in the VPS is invalid. If the SPS and the PPS each include the flag bit but the flag bit in the SPS is different from the flag bit in the PPS, the flag bit in the PPS is valid, and the flag bit in the SPS is invalid. If the SPS and the slice header each include the flag bit but the flag bit in the SPS is different from the flag bit in the slice header, the flag bit in the slice header is valid, and the flag bit in the SPS is invalid. If the PPS and the slice header each include the flag bit but the flag bit in the PPS is different from the flag bit in the slice header, the flag bit in the slice header is valid, and the flag bit in the PPS is invalid. If syntax structures of a plurality of levels each include the flag bit but the flag bits are different, the flag bit in a syntax structure of a lowest level is valid, and the flag bit in a syntax structure of an upper level is invalid.

When these flag bits are valid, syntax element semantics of these flag bits are as follows:

When scent_perception_enable_flag is a first value (for example, 1), it indicates that an object olfaction perception attribute switch related to scent_perception_enable_flag is enabled, and a corresponding object olfaction perception attribute may be parsed; or when scent_perception_enable_flag is a second value (for example, 0), it indicates that an object olfaction perception attribute cannot be parsed.

When tactility_perception_enable_flag is a first value (for example, 1), it indicates that an object tactility perception attribute switch related to tactility_perception_enable_flag is enabled, and a corresponding object tactility perception attribute may be parsed; or when tactility_perception_enable_flag is a second value (for example, 0), it indicates that an object tactility perception attribute cannot be parsed.

The coding unit syntax structure coding_unit( ) may be shown in Table 1, and details are not described herein again.

The coding unit perception attribute syntax structure cu_sensation_info( ) may be shown in Table 4.

TABLE 4

Coding unit perception attribute syntax structure cu_sensation_info( )

| cu_sensation_info(x0, y0) { | Descriptor |
|---|---|
| if (scent_perception_enable_flag \|\| tactility_perception_enable_flag) { | |
| object_distance[x0][y0] | |
| if (scent_perception_enable_flag) { | |
| scent_code[x0][y0] | |
| scent_maximum_strength[x0][y0] | |
| } | |
| if (tactility_perception_enable_flag) { | |
| tactility_code[x0][y0] | |
| tactility_strength[x0][y0] | |
| } | |
| } | |
| } | |

In this case, in a decoding process, the terminal device may first parse flag bits scent_perception_enable_flag and tactility_perception_enable_flag; then determine, based on values of scent_perception_enable_flag and tactility_perception_enable_flag, whether corresponding perception attribute information needs to be parsed; and if the corresponding perception attribute information needs to be parsed, separately parse information about an olfaction perception attribute and a tactility perception attribute of the object that are identified in the CU. The player renders or does not render a corresponding perception attribute based on content obtained through parsing.

Case 2: Different perception attribute codes are used to control whether a perception attribute of an object needs to be parsed in a bitstream.

The coding unit syntax structure coding_unit( ) may be shown in Table 1, and details are not described herein again.

The coding unit perception attribute syntax structure cu_sensation_info( ) may be shown in Table 5.

TABLE 5

Coding unit perception attribute syntax structure cu_sensation_info( )

| cu_sensation_info(x0, y0) { | Descriptor |
|---|---|
| scent_code[x0][y0] | |
| if (scent_code[x0][y0]) { | |
| scent_maximum_strength[x0][y0] | |
| } | |
| tactility_code[x0][y0] | |
| if (tactility_code[x0][y0]) { | |
| tactility_strength[x0][y0] | |
| } | |
| if (scent_code[x0][y0] \|\| tactility_code[x0][y0]) { | |
| object_distance[x0][y0] | |
| } | |
| } | |

Different from Case 1, a perception attribute code is used as a condition for determining whether the perception attribute of the object is to be parsed. In this case, semantic changes of syntax elements of the coding unit perception attribute syntax structure are as follows:

scent_code[x0][y0]: indicates a scent code of an object in a CU at an image coordinate point (x0, y0). A value of the scent code may be a numerical value 0, 1, 2, . . . . When the scent code is 0, it indicates that there is no olfaction perception attribute of the object in the CU at (x0, y0), and no further parsing is required. When the scent code is not 0, the scent code separately indicates different scents emitted by different objects, the value is related to a material and a structure of the object, and the decoder parses an olfaction perception attribute of the object.

tactility_code[x0][y0]: indicates a tactility code of the object in the CU at the image coordinate point (x0, y0). The tactility code may be a numerical value 0, 1, 2, . . . . When the tactility code is 0, it indicates that there is no tactility perception attribute of the object in the CU at (x0, y0), and no further parsing is required. When the tactility code is not 0, the tactility code separately indicates different tactility types of a human body when different objects are touched, and the decoder parses a tactility perception attribute of the object.

It should be understood that, because there may be no object whose perception attribute needs to be parsed in the CU, when both the scent code and the tactility code are 0, the terminal device may no longer parse the syntax element object_distance[x0][y0]. If either of the scent code and the tactility code is not 0, the terminal device needs to parse the syntax element object_distance[x0] [y0].

Embodiment 2: Perception Attribute Information is Carried in Supplemental Enhancement Information SEI This embodiment is the same as Embodiment 1 in steps, and a main difference lies in that a manner of encoding the perception attribute information into a video bitstream is different. In Embodiment 1, a syntax element used to indicate the perception attribute information is encoded into a structure of an image CU. However, in this embodiment, the syntax element used to indicate the perception attribute information is encoded into the SEI, as shown in Table 6.

TABLE 6

| General SEI syntax | |
| --- | --- |
| sei_payload(payloadType, payloadSize) { | Descriptor |
|     if(nal_unit_type  ==  PREFIX_SEI_NUT) | |
|         if(payloadType  ==  0) | |
|             buffering_period(payloadSize) | |
|         ... | |
|         else if(payloadType  ==  154) | |
|             omni_viewport(payloadSize) | |
|         else if(payloadType == 155) | |
|             sensation_info (payloadSize) | |
|         ... | |
|         else if(payloadType  ==  160) | |
|             layers not_present(payloadSize) | |
|     } | |
| } | |

TABLE 7

| Perception information SEI syntax sensation_info( ) | |
| --- | --- |
| sensation_info (payloadSize) { | Descriptor |
|     sensation_object_rect_cnt_minus1 | |
|     for(i = 0; i <= sensation_rect_cnt_minus1; i++) { | |
|         sensation_object_rect_left[i] | |
|         sensation_object_rect_top[i] | |
|         sensation_object_rect_right[i] | |
|         sensation_object_rect_bottom[i] | |
|         object_distance[i] | |
|         scent_code[i] | |
|         scent_maximum_strength[i] | |
|         tactility_code[i] | |
|         tactility_maximum_strength[i] | |
|     } | |
| } | |

Semantic interpretation of a syntax element included in an SEI syntax structure sensation_info( ) is as follows:

sensation_object_rect_cnt_minus1: a value of sensation_object_rect_cnt_minus1 indicates a quantity of objects that can be perceived and that are included in a current video frame minus 1.

sensation_object_rect_left[i]: indicates a left-most horizontal direction coordinate value of a rectangular frame that is used to identify the $i^{th}$ object that can be perceived in a video image.

sensation_object_rect_top[i]: indicates a top-most vertical direction coordinate value of the rectangular frame that is used to identify the $i^{th}$ object that can be perceived in the video image.

sensation_object_rect_right[i]: indicates a right-most horizontal direction coordinate value of the rectangular frame that is used to identify the $i^{th}$ object that can be perceived in the video image.

sensation_object_rect_bottom[i]: indicates a bottom-most vertical direction coordinate value of the rectangular frame that is used to identify the $i^{th}$ object that can be perceived in the video image.

object_distance[i]: indicates a distance measurement value between the $i^{th}$ object that can be perceived in the image and a video capture apparatus during photographing, that is, a distance measurement value between the object and a panoramic sphere center. A default measurement unit may be a standard international measurement unit meter (m)/kilometer (km).

scent_code[i]: indicates a scent code of the $i^{th}$ object that can be perceived in the image. A value of the scent code may be a numerical value 0, 1, 2, . . . , which separately indicates different scents emitted by different objects. The value is related to a material and a structure of the object.

scent_maximum_strength[i]: indicates a maximum strength of a scent emitted by the $i^{th}$ object that can be perceived in the image.

tactility_code[i]: indicates a tactility code of the $i^{th}$ object that can be perceived in the image. A value of the tactility code may be a numerical value 0, 1, 2, . . . , which separately indicates different tactility types of a human body when different objects are touched.

tactility_maximum_strength[i]: indicates a maximum tactility strength of the $i^{th}$ object that can be perceived in the image.

For a terminal device, a difference in a decoding and rendering process in comparison with Embodiment 1 mainly lies in that a perception attribute, spatial location information, and the like of an object do not need to be obtained by parsing a CU syntax structure in an image, but are obtained by parsing the SEI in the video bitstream.

In an embodiment, in the SEI, different perception attribute codes may be alternatively used to control whether the perception attribute of the object is to be parsed. Therefore, a representation of a syntax structure sensation_info( ) may be shown in Table 8.

TABLE 8

Perception information SEI message syntax sensation_info( )

| sensation_info (payloadSize) { | Descriptor |
| --- | --- |
| sensation_object_rect_cnt_minus1 | |
| for(i = 0; i <= sensation_rect_cnt_minus1; i++) { | |
| sensation_object_rect_left[i] | |
| sensation_object_rect_top[i] | |
| sensation_object_rect_right[i] | |
| sensation_object_rect_bottom[i] | |
| object_distance[i] | |
| scent_code[i] | |
| if (scent_code[i]) { | |
| scent_maximum_strength[i] | |
| } | |
| tactility_code[i] | |
| if (tactility_code[i]) { | |
| tactility_maximum_strength[i] | |
| } | |
| } | |
| } | |

In this example, relative to Table 7, syntax elements with semantic changes are interpreted as follows:

scent_code[i]: indicates the scent code of the $i^{th}$ object that can be perceived in the image. The value of the scent code may be a numerical value 0, 1, 2, .... When the scent code is 0, it indicates that there is no olfaction perception attribute of the $i^{th}$ object that can be perceived, and no further parsing is required. When the scent code is not 0, the scent code separately indicates different scents emitted by different objects, the value is related to the material and the structure of the object, and a decoder parses an olfaction perception attribute of the object.

tactility_code[i]: indicates the tactility code of the $i^{th}$ object that can be perceived in the image. The value of the tactility code may be a numerical value 0, 1, 2, .... When the tactility code is 0, it indicates that there is no tactility perception attribute of the $i^{th}$ object that can be perceived, and no further parsing is required. When the tactility code is not 0, the tactility code separately indicates different tactility types of the human body when different objects are touched, and the decoder parses a tactility perception attribute of the object.

It should be understood that, in this embodiment of this application, the SEI is for the entire video bitstream. Because there is sensation_object_rect_cnt_minus1 in the SEI, that is, there is at least one object whose attribute needs to be perceived, the two elements scent_code[i] and tactility_code[i] are not usually 0 at the same time.

Embodiment 3: Perception Attribute Information is Carried in a Media File Format Server Side Step 1: A server obtains panoramic source video data captured by a video capture apparatus, and for an object whose perception attribute needs to be encoded in a scene, obtains perception attribute information of the object captured by the video capture apparatus and spatial location information of the object. It should be understood that the object whose perception attribute needs to be encoded in a video is usually preconfigured.

In an embodiment, in this embodiment of this application, a scent capture apparatus and/or a tactility sensing apparatus may be placed on the object to capture the perception attribute of the object, and in addition, spatial location information of each object relative to the scent capture apparatus and/or the tactility sensing apparatus is obtained.

Step 2: The server encodes the source video data, processes different perception information of the object, and stores the different perception information of the object as encoded or non-encoded binary data streams. Herein, binary data streams may be separately organized for different perception attributes, in other words, one binary data stream is generated for each attribute.

Step 3: The server sends these binary data streams to an encapsulator for encapsulation, and stores encapsulated binary data streams on the server; or sends an encapsulated file to a terminal device by using a sending/transmission apparatus. An encapsulation manner may be that encapsulation is performed in a media file manner, or that encapsulation is performed in a manner applicable to network transmission. This is not limited in this embodiment of this application.

In a possible implementation, a manner of encapsulating the binary data stream of the perception attribute information into sample data in a file may be as follows:

A ScentSample syntax structure is added for a structure of an olfaction perception attribute:

```
aligned(8) ScentInfoStruct( ) {
    unsigned int(32) scent_code;
    unsigned int(32) scent_maximum_strength;
}
aligned(8) ScentSample( ) {
    for(i=0; i<num_object_rects; i++) {
        unsigned int(32) rect_left;
        unsigned int(32) rect_top;
        unsigned int(32) rect_right;
        unsigned int(32) rect_bottom;
        unsigned int(32) object_distance;
        ScentInfoStruct( )
    }
}
```

Semantic interpretation of a syntax element is as follows:

rect_left: indicates a left-most horizontal direction coordinate value of a rectangular frame of the $i^{th}$ object that can be perceived in a corresponding video image.

rect_top: indicates a top-most vertical direction coordinate value of the rectangular frame of the $i^{th}$ object that can be perceived in the corresponding video image.

rect_right: indicates a right-most horizontal direction coordinate value of the rectangular frame of the $i^{th}$ object that can be perceived in the corresponding video image.

rect_bottom: indicates a bottom-most vertical direction coordinate value of the rectangular frame of the $i^{th}$ object that can be perceived in the corresponding video image.

object_distance: indicates a distance measurement value between the $i^{th}$ object that can be perceived in the corresponding video image and the video capture apparatus during photographing, that is, a distance measurement value between the object and a panoramic sphere center. A default measurement unit may be a standard international measurement unit meter (m)/kilometer (km).

Corresponding syntax element semantics in an added structure ScentInfoStruct are as follows:

scent_code: indicates a scent code of the $i^{th}$ object on which olfaction perception can be performed in the corresponding video image. A value of the scent code may be a numerical value 0, 1, 2, . . . , which separately indicates different scents emitted by different objects. The value is related to a material and a structure of the object.

scent_maximum_strength: indicates a maximum strength of a scent emitted by the $i^{th}$ object that can be perceived in the image.

A TactilitySample syntax structure is added for a structure of a tactility perception attribute:

```
aligned(8) TactilityInfoStruct( ) {
unsigned int(32) tactility_code;
unsigned int(32) tactility_maximum_strength;
}
aligned(8) Tactility Sample( ) {
for(i=0; i<num_object_rects; i++) {
    unsigned int(32) rect_left;
    unsigned int(32) rect_top;
    unsigned int(32) rect_right;
    unsigned int(32) rect_bottom;
    unsigned int(32) object_distance;
    TactilityInfoStruct( )
}
}
```

Syntax element semantics of rect_left, rect_top, rect_right, rect_bottom, and object_distance are the same as syntax element semantics of the olfaction perception attribute. Corresponding syntax element semantics in an added structure TactilityInfoStruct are as follows:

tactility_code: indicates a tactility code of the $i^{th}$ object on which tactility perception can be performed in the corresponding video image. A value of the tactility code may be a numerical value 0, 1, 2, . . . , which separately indicates different tactility types of a human body when different objects are touched.

tactility_maximum_strength: indicates a maximum tactility strength of the $i^{th}$ object on which tactility perception can be performed in the corresponding video image.

Terminal Device Side

Step 1: A terminal device obtains an encapsulated video bitstream and a media file format corresponding to the video bitstream, and the media file format carries perception attribute information of an object.

In an embodiment, the terminal device may request the video bitstream from a server; the terminal device may directly receive the video bitstream sent by a server; or the terminal device stores the video bitstream and obtains the video bitstream from a memory. This is not limited in this embodiment of this application.

Step 2: The terminal device sends the media file format to a bitstream decapsulation apparatus for decapsulation, and the bitstream decapsulation apparatus outputs a data stream that is suitable for decoding of a decoder. In this step, for the media file format in which the foregoing server encapsulates the perception attribute information, the decapsulation apparatus obtains a perception attribute sample encapsulated in the file, for example, the foregoing ScentSample and Tactility Sample.

Step 3: The terminal device decodes and renders a decapsulated data stream.

In an embodiment, the terminal device may decode the perception attribute sample obtained in step 2, to obtain olfaction perception attribute information and tactility perception attribute information that are corresponding to each object in each frame of video, that is, the foregoing scent_code, scent_maximum_strength, tactility_code, tactility_maximum_strength, and the like, and obtain locations rect_left, rect_top, rect_right, and rect_bottom of each object in the video image, and spatial distance information object_distance of the object. The terminal device may perform rendering and playing in a manner similar to that in Embodiment 1, so that a user perceives a sensation corresponding to the object. Details are not described herein again.

In an embodiment, the server may add, to an encapsulated video file, a box (box) used to indicate whether there is the perception attribute information of the object. In an embodiment, the following several cases may be used.

Case 1: A perception information box type SensationInfoBox is added to a moov box, to describe whether there is the perception attribute information in the video file.

```
aligned(8) class SensationInfoBox extends FullBox('snsa', version = 0, flags) {
    bit(5) reserved = 0;
unsigned int(1) scent info;
unsigned int(1) tactility info;
}
```

When scent_info is 0, it indicates that there is no olfaction perception attribute information in the video file, or when scent_info is 1, it indicates that there is the olfaction perception attribute information in the video file. When tactility_info is 0, it indicates that there is no tactility perception attribute information in the video file, or when tactility_info is 1, it indicates that there is the tactility perception attribute information in the video file.

Case 2: A version of SensationInfoBox is used to indicate that a current box indicates the olfaction perception attribute information or indicates the tactility perception attribute information.

For example, SensationInfoBox is defined as follows:

```
aligned(8) class SensationInfoBox extends FullBox('snsa', version, flags) {
}
```

When the version is a first value (for example, 1), it indicates that the video file carries olfaction perception attribute information. When the version is a second value (for example, 2), it indicates that the video file carries tactility perception information. When the version is a third value (for example, 3), it indicates that the video file carries olfaction perception attribute information and tactility perception information.

Case 3: Flags of SensationInfoBox are used to indicate that a current box indicates the olfaction perception attribute information or indicates the tactility perception attribute information.

For example, SensationInfoBox is defined as follows:

```
aligned(8) class SensationInfoBox extends FullBox('snsa', version, flags) {
}
```

When the flags are a first value (for example, 1), it indicates that the video file carries the olfaction perception attribute information. When the flags are a second value (for example, 2), it indicates that the video file carries the tactility perception information. When the flags are a third value (for example, 3), it indicates that the video file carries the olfaction perception attribute information and the tactility perception information.

Case 4: An indication is separately performed by separately defining boxes of the olfaction perception attribute information and the tactility perception attribute information.

For example, an olfaction perception attribute information box type ScentInfoBox is defined as follows:

```
aligned(8) class ScentInfoBox extends FullBox('scet', version, flags)
{
}
```

A tactility perception information box type TactilityInfoBox is defined as follows:

```
aligned(8) class TactilityInfoBox extends FullBox('tact', version, flags)
{
}
```

The terminal device may determine, based on whether these boxes exist, whether there is the olfaction perception attribute information or the tactility perception attribute information in the video file.

Embodiment 4: Perception Attribute Information is Carried in an MPD

Server Side

Step 1: This step is the same as step 1 corresponding to the server side in Embodiment 3.

Step 2: A server encodes source video data to obtain a video bitstream.

Step 3: The server sends the video bitstream to an encapsulator for encapsulation, and stores an encapsulated video bitstream on the server; or sends an encapsulated video bitstream to a terminal device by using a sending/transmission apparatus. An encapsulation manner may be that encapsulation is performed in a media file manner, or that encapsulation is performed in a manner applicable to network transmission. In addition, the server uses a file encapsulation and preparation manner applicable to network transmission, for example, uses a dynamic adaptive streaming over HTTP (DASH) standard to describe perception attribute information of different objects in the video bitstream in an MPD file. In an embodiment, the server may determine perception attribute information and spatial location information of an object whose perception attribute needs to encoded in the video bitstream, and add the perception attribute information and the spatial location information to the MPD file corresponding to the video bitstream.

An example of a description of specifying perception attribute information in the MPD for a data stream with a perception attribute such as a sense of smell and a sense of touch is as follows:

```
<?xml version="1.0" encoding="UTF-8"?>
<MPD
    xmlns="urn:mpeg:dash:schema:mpd:2011"
    type="static"
    mediaPresentationDuration="PT10S"
    minBufferTime="PT1S"
    profiles="urn:mpeg:dash:profile:isoff-on-demand:2011">
    <Period>
        <! -- Video description -->
        <AdaptationSet    segmentAlignment="true"    subsegmentAlignment="true" subsegmentStartsWithSAP="1">
            <Representation    mimeType="video/mp4"    codecs="avc1.42c00d" width="3840" height="1920" bandwidth="79707" startWithSAP="1">
                <BaseURL> video.mp4</BaseURL>
            </Representation>
        </AdaptationSet>
        <! - Olfaction perception attribute information description -->
        <AdaptationSet segmentAlignment="true" subsegmentAlignment="true">
            <Representation    mimeType="sensation/mp4"    bandwidth=" 79707" sensationType="1" >
                <BaseURL> scent.mp4</BaseURL>
            </Representation>
        </AdaptationSet>
        <! - Tactility perception attribute information description -->
        <AdaptationSet segmentAlignment="true" subsegmentAlignment="true">
            <Representation    mimeType="sensation/mp4"    bandwidth=" 79707" sensationType="2" >
                <BaseURL> tactility.mp4</BaseURL>
            </Representation>
        </AdaptationSet>
        ...
    </Period>
</MPD>
```

In this embodiment of this application, a video file of each type of perception information may be described in different AdaptationSet. In a Representation field, a Multipurpose Internet Mail Extensions (MIME) type is newly defined as sensation/mp4, and a corresponding attribute sensationType is defined. A first value (for example, 1) of sensationType indicates that a video file in a BaseURL field is an olfaction perception file, and a second value (for example, 2) of sensationType indicates a tactility perception file.

In an embodiment, the video file is indicated as the olfaction perception file or the tactility perception file by specifying a new attribute in EssentialProperty, such as SensationInfo@value, as described below:

```
<?xml version="1.0" encoding="UTF-8"?>
<MPD
  xmlns="urn:mpeg:dash:schema:mpd:2011"
  type="static"
  mediaPresentationDuration="PT10S"
  minBufferTime="PT1S"
  profiles="urn:mpeg:dash:profile:isoff-on-demand:2011">
  <Period>
      <! -- Video description -->
      <AdaptationSet   segmentAlignment="true"   subsegmentAlignment="true" subsegmentStartsWithSAP="1">
          <Representation   mimeType="video/mp4"   codecs="avc1.42c00d" width="3840" height="1920" bandwidth="79707" startWithSAP="1">
              <BaseURL> video.mp4</BaseURL>
          </Representation>
      </AdaptationSet>
      <! - Olfaction perception attribute information description -->
      <AdaptationSet segmentAlignment="true" subsegmentAlignment="true">
          <Representation   mimeType="video/mp4"   codecs="avc1.42c00d" bandwidth="79707" >
          <EssentialProperty   schemeIdUri="urn:mpeg:dash:SensationInfo:2014" value="1"/>
              <BaseURL> scent.mp4</BaseURL>
          </Representation>
      </AdaptationSet>
      <! - Tactility perception attribute information description -->
      <AdaptationSet segmentAlignment="true" subsegmentAlignment="true">
          <Representation   mimeType="video/mp4"   codecs="avc1.42c00d" bandwidth="79707" >
          <EssentialProperty   schemeIdUri="urn:mpeg:dash:SensationInfo:2014" value="2"/>
              <BaseURL> tactility.mp4</BaseURL>
          </Representation>
      </AdaptationSet>
  ...
  </Period>
</MPD>
```

An attribute description of SensationInfo@value is shown in the following table.

TABLE 9

Attribute description of SensationInfo@value

| SensationInfo@value | Description |
| --- | --- |
| information | specifies information of different sensations |

An information element indicates a value of value, a first value (for example, 1) of information indicates that information in the BaseURL field is olfaction perception attribute information, and a second value (for example, 2) of information indicates that information in the BaseURL field is tactility perception information.

Terminal Device Side

Step 1: This step is the same as step 1 corresponding to the terminal device side in Embodiment 3.

Step 2: A terminal device sends a video bitstream to a bitstream decapsulation apparatus for decapsulation, and the bitstream decapsulation apparatus outputs a file that is suitable for decoding of a video decoder. In this step, for an MPD file in which the foregoing server gives a perception attribute information description, the terminal device may parse a related description of corresponding perception attribute information in the corresponding MPD file, for example, values of mimeType and sensationType, to obtain the perception attribute information in the MPD file.

Step 3: This step is the same as step 3 corresponding to the terminal device side in Embodiment 3.

It should be understood that perception attribute information of an object may be carried only in a media file format, may be carried only in an MPD, or may be carried in both a media file format and an MPD. Perception attribute information in the media file format and perception attribute information in the MPD may be the same or different. When the perception attribute information in the media file format is different from the perception attribute information in the MPD, the server and the terminal device may agree to use one of the perception attribute information in the media file format and the perception attribute information in the MPD to perform parsing and rendering. This is not limited in this embodiment of this application.

In conclusion, in this application, information such as the perception attribute information of the object and the spatial location of the object related to the video is added to the video bitstream, the SEI, the media file format, or the media presentation description MPD, so that the player can render, based on different visual angles or locations of the user in a panoramic video, a perception attribute currently used for interaction, and the user has immersive experience when watching the panoramic video, and has a stronger immersion sense, thereby improving subjective feelings of the user.

It should be understood that sequence numbers of the foregoing processes do not mean particular execution sequences. The execution sequences of the processes should be determined based on functions and internal logic of the processes, and should not be construed as any limitation on the implementation processes of the embodiments of this application.

Figure 5:
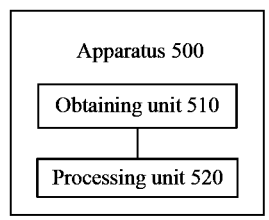
FIG. 5 is a schematic block diagram of another video processing apparatus according to an embodiment of this application.
Figure 6:
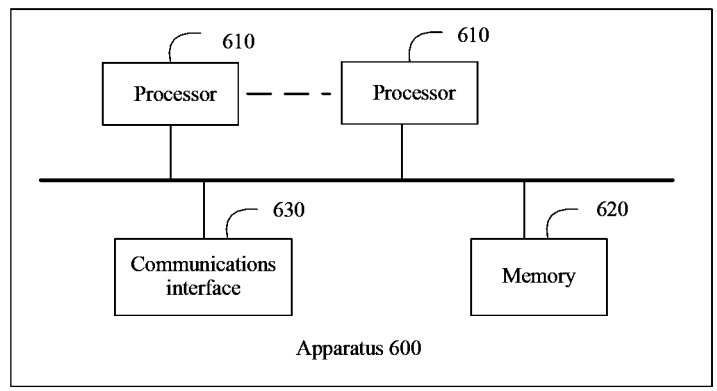
FIG. 6 is a schematic block diagram of another video processing apparatus according to an embodiment of this application.

The foregoing details the video processing methods in the embodiments of this application with reference to FIG. 1 to FIG. 3. The following details video processing apparatuses in the embodiments of this application with reference to FIG. 4 to FIG. 6. It should be understood that the video processing apparatuses described in FIG. 4 to FIG. 6 can perform each step of the video processing methods in FIG. 1 to FIG. 3. Limitations on each step in FIG. 1 to FIG. 3 are also applicable to the apparatuses shown in FIG. 4 to FIG. 6. Therefore, for brevity, repeated descriptions are appropriately omitted when the apparatuses shown in FIG. 4 to FIG. 6 are described below.

FIG. 4 is a schematic block diagram of a video processing apparatus according to an embodiment of this application. The apparatus 400 shown in FIG. 4 includes:

an obtaining unit 410, configured to obtain source video data; and a processing unit 420, configured to determine at least one object whose perception attribute information needs to be encoded in the source video data, where the perception attribute information is used to indicate a property presented when the at least one object is perceived by a user.

The obtaining unit 410 is further configured to obtain the perception attribute information of the at least one object and spatial location information of the at least one object.

The processing unit 420 is further configured to: add the perception attribute information and the spatial location information to a video bitstream generated after the source video data is encoded or a video file of the source video data, where the video file is used to describe a video attribute of the source video data; and encapsulate the video bitstream or the video file.

In the video processing apparatus in this embodiment of this application, a human body perception attribute other than a sense of vision and a sense of hearing is indicated in the video bitstream or the video file, and a perception attribute of an object is associated with a spatial location of the object in a video, so that different objects in the video bring different perception to the user, thereby obtaining better user experience.

In an embodiment, the processing unit 420 is configured to: determine a syntax element of a target object in the at least one object, where the syntax element is used to indicate perception attribute information of the target object and spatial location information of the target object; and encode the syntax element into a CU syntax structure or SEI corresponding to the target object, to obtain the video bitstream.

In an embodiment, the processing unit 420 is configured to: determine a syntax element of a target object in the at least one object, where the syntax element is used to indicate perception attribute information of the target object and spatial location information of the target object; and add the syntax element to a media file format or an MPD of the video file.

In an embodiment, the spatial location information of the at least one object includes a distance measurement value between the at least one object and a perception attribute information capture apparatus; and the perception attribute information of the at least one object includes at least one of the following information: a scent code of the at least one object, a maximum scent strength of the at least one object, a tactility code of the at least one object, and a maximum tactility strength of the at least one object, where the scent code is used to indicate a type of a scent emitted by the at least one object, and the tactility code is used to indicate a tactility type of the user when the at least one object is touched.

In an embodiment, the video bitstream or the video file includes a flag bit, and the flag bit is used to indicate whether the perception attribute information of the at least one object needs to be parsed.

In an embodiment, the flag bit is included in a header structure of the video bitstream; the flag bit is included in the perception attribute information of the video bitstream; or the flag bit is included in a box of the video file.

It should be understood that the apparatus 400 herein is embodied in a form of functional units. The term "unit" herein may be an application-specific integrated circuit (ASIC), an electronic circuit, a processor (for example, a shared processor, a dedicated processor, or a group processor) configured to execute one or more software or firmware programs and a memory, a merged logic circuit, and/or another appropriate component that supports the described functions. In an example, a person skilled in the art may understand that the apparatus 400 may be the server in the foregoing embodiment, and the apparatus 400 may be configured to perform procedures and/or steps corresponding to the server in the foregoing method embodiment. To avoid repetition, details are not described herein again.

In this embodiment of this application, the apparatus in FIG. 4 may be alternatively a chip or a chip system, for example, a system on chip (SoC). Correspondingly, a transceiver unit may be a transceiver circuit of the chip. This is not limited in this embodiment of this application.

FIG. 5 is a schematic block diagram of a video processing apparatus according to an embodiment of this application. The apparatus 500 shown in FIG. 5 includes:

an obtaining unit 510, configured to obtain a video bitstream or a video file, where the video bitstream or the video file carries perception attribute information of at least one object and spatial location information of the at least one object, the perception attribute information is used to indicate a property presented when the at least one object is perceived by a user, the video bitstream is generated after source video data is encoded, and the video file is used to describe a video attribute of the source video data, where the obtaining unit 510 is further configured to obtain perception attribute information of at least one target object and spatial location information of the at least one target object in the video bitstream or the video file, where the at least one object includes the at least one target object; and a processing unit 520, configured to perform perception rendering on a perception attribute of the at least one target object based on behavior of the user in combination with the perception attribute information of the at least one target object and the spatial location information of the at least one target object.

In the video processing apparatus in this embodiment of this application, a human body perception attribute other than a sense of vision and a sense of hearing is indicated in the video bitstream or the video file, and a perception attribute of an object is associated with a spatial location of the object in a video, so that different objects in the video bring different perception to the user, thereby obtaining better user experience.

In an embodiment, the processing unit 520 is further configured to: decode the video bitstream, and obtain the perception attribute information of the at least one target object and the spatial location information of the at least one target object from a CU syntax structure or SEI corresponding to the at least one target object; or decapsulate the video file, and obtain the perception attribute information of the at least one target object and the spatial location information of the at least one target object from a media file format or an MPD of the video file.

In an embodiment, the spatial location information of the at least one object includes a distance measurement value between the at least one object and a perception attribute information capture apparatus; and the perception attribute information of the at least one object includes at least one of the following information: a scent code of the at least one object, a maximum scent strength of the at least one object, a tactility code of the at least one object, and a maximum tactility strength of the at least one object, where the scent code is used to indicate a type of a scent emitted by the at least one object, and the tactility code is used to indicate a tactility type of the user when the at least one object is touched.

In an embodiment, the processing unit 520 is configured to: determine a scent strength value of a first target object at a current location of the user based on the current location of the user, spatial location information of the first target object in the at least one target object, and a maximum scent strength of the first target object; and emit a scent corresponding to the scent strength value and a scent code of the first target object.

In an embodiment, the processing unit 520 is configured to: determine a touch strength value of a second target object at a touch point of the user based on a current location of the touch point of the user, spatial location information of the second target object in the at least one target object, and a maximum tactility strength of the second target object; and feed back tactility perception corresponding to the touch strength value and a tactility code of the second target object to the user.

In an embodiment, the video bitstream or the video file includes a flag bit, and the flag bit is used to indicate whether the perception attribute information of the at least one object needs to be parsed; and the processing unit 520 is further configured to: before obtaining the perception attribute information of the at least one target object within a current visual angle of the user based on a visual angle of the user and the video bitstream or the video file, determine, based on the flag bit, whether the perception attribute information of the at least one object needs to be parsed.

In an embodiment, the flag bit is included in a header structure of the video bitstream; the flag bit is included in the perception attribute information of the video bitstream; or the flag bit is included in a box of the video file.

It should be understood that the apparatus 500 herein is embodied in a form of functional units. The term "unit" herein may be an ASIC, an electronic circuit, a processor (for example, a shared processor, a dedicated processor, or a group processor) configured to execute one or more software or firmware programs and a memory, a merged logic circuit, and/or another appropriate component that supports the described functions. In an example, a person skilled in the art may understand that the apparatus 500 may be the terminal device in the foregoing embodiment, and the apparatus 500 may be configured to perform procedures and/or steps corresponding to the terminal device in the foregoing method embodiment. To avoid repetition, details are not described herein again.

In this embodiment of this application, the apparatus in FIG. 5 may be alternatively a chip or a chip system, for example, a system on chip (SoC). Correspondingly, a transceiver unit may be a transceiver circuit of the chip. This is not limited in this embodiment of this application.

FIG. 6 is a schematic structural diagram of hardware of another video processing apparatus according to an embodiment of this application. The apparatus 600 shown in FIG. 6 may be considered as a computer device. The apparatus 600 may be used as an implementation of the video processing apparatus in this embodiment of this application, or may be used as an implementation of a video processing method in an embodiment of this application. The apparatus 600 includes a processor 610, a memory 620, and a communications interface 630. In an embodiment, the apparatus 600 may further include an input/output interface and a bus. The processor 610, the memory 620, the communications interface 630, and the input/output interface may implement mutual communication connections by using the bus.

In an embodiment, the apparatus 600 may perform steps corresponding to the server in the foregoing method embodiment. The processor 610 is configured to: obtain source video data by using the communications interface 630; determine at least one object whose perception attribute information needs to be encoded in the source video data, where the perception attribute information is used to indicate a property presented when the at least one object is perceived by a user; obtain the perception attribute information of the at least one object and spatial location information of the at least one object; add the perception attribute information and the spatial location information to a video bitstream generated after the source video data is encoded or a video file of the source video data, where the video file is used to describe a video attribute of the source video data; and encapsulate the video bitstream or the video file.

In an embodiment, the apparatus 600 may perform steps corresponding to the terminal device in the foregoing method embodiment. The processor 610 is configured to: obtain a video bitstream or a video file by using the communications interface 630, where the video bitstream or the video file carries perception attribute information of at least one object and spatial location information of the at least one object, the perception attribute information is used to indicate a property presented when the at least one object is perceived by a user, the video bitstream is generated after source video data is encoded, and the video file is used to describe a video attribute of the source video data; obtain perception attribute information of at least one target object and spatial location information of the at least one target object in the video bitstream or the video file, where the at least one object includes the at least one target object; and perform perception rendering on a perception attribute of the at least one target object based on behavior of the user in combination with the perception attribute information of the at least one target object and the spatial location information of the at least one target object.

The processor 610 may be a general-purpose central processing unit (CPU), a microprocessor, an ASIC, or one or more integrated circuits, and is configured to execute a related program, so as to implement functions that need to be performed by the modules in the video processing apparatus in this embodiment of this application, or perform the video processing method in the method embodiment of this application. The processor 610 may be an integrated circuit chip and has a signal processing capability. In an embodiment, the steps in the foregoing method may be implemented by using an integrated logic circuit of hardware in the processor 610 or an instruction in a form of software. The processor 610 may be a general purpose processor, a digital signal processor (DSP), an ASIC, a field programmable gate array (FPGA), another programmable logic device, a discrete gate, a transistor logic device, or a discrete hardware component. The processor 610 may implement or perform the methods, the steps, and the logical block diagrams that are disclosed in the embodiments of this application. The general purpose processor may be a microprocessor, or the processor may be any conventional processor or the like. The steps of the methods disclosed with reference to the embodiments of this application may be directly performed and implemented by using a hardware decoding processor, or may be performed and implemented by using a combination of hardware in a decoding processor and a software module. The software module may be located in a mature storage medium in the art, such as a random access memory, a flash memory, a read-only memory, a programmable read-only memory, an electrically erasable programmable memory, or a register. The storage medium is located in the memory 620. The processor 610 reads information from the memory 620, and implements, in combination with the hardware of the processor 610, the functions that need to be performed by the modules included in the video processing apparatus in this embodiment of this application, or performs the video processing method in the method embodiment of this application.

The memory 620 may be a read-only memory (ROM), a static storage device, a dynamic storage device, or a random access memory (RAM). The memory 620 may store an operating system and another application program. When the functions that need to be performed by the modules included in the video processing apparatus in this embodiment of this application or the video processing method in the method embodiment of this application is implemented by using software or firmware, program code used to implement the technical solutions provided in this embodiment of this application is stored in the memory 620, and the processor 610 performs operations that need to be performed by the modules included in the video processing apparatus, or performs the video processing method provided in the method embodiment of this application.

The communications interface 630 uses a transceiver apparatus, for example, including but not limited to a transceiver, to implement communication between the apparatus 600 and another device or a communications network. The communications interface 630 may be used as an obtaining module or a sending module in a processing apparatus.

In an embodiment, the input/output interface is configured to receive input data and information, and output data such as an operation result. The bus 605 may include a path for transmitting information between components (for example, the processor 610, the memory 620, the input/output interface, and the communications interface 630) of the apparatus 600.

It should be noted that, although for the apparatus 600 shown in FIG. 6, only the processor 610, the memory 620, and the communications interface 630 are shown, in an embodiment, a person skilled in the art should understand that the apparatus 600 further includes another component required for normal running. For example, the apparatus 600 may further include a display, configured to display video data to be played. In addition, a person skilled in the art should understand that, based on a specific requirement, the apparatus 600 may further include a hardware device that implements another additional function. In addition, a person skilled in the art should understand that the apparatus 600 may include only components required for implementing this embodiment of this application, but not necessarily include all the components shown in FIG. 6.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for ease of convenience and brevity, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented in indirect couplings or communication connections through some interfaces, apparatuses, or units, and may be in electrical, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (e.g., a personal computer, a server, a network device, or the like) to perform all or some of the steps of the methods described in the embodiments of this application. The foregoing storage medium includes any medium that can store program code, such as a universal serial bus (USB) flash drive, a removable hard disk, a ROM, a RAM, a magnetic disk, or an optical disc.

The foregoing descriptions are merely embodiments of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method of video processing, comprising:
   obtaining, by a server, source video data;
   determining, by the server, at least one object having perception attribute information to be encoded in the source video data, wherein the perception attribute information indicates a human body perception attribute of the at least one object and is used to indicate a property presented when the at least one object is perceived by a human user;
   obtaining, by the server, the perception attribute information of the at least one object and spatial location information of the at least one object, wherein the spatial location information is used to indicate a spatial location of the at least one object;
   adding, by the server, the perception attribute information and the spatial location information to a video bitstream generated after the source video data is encoded or a video file of the source video data, wherein the video file is used to describe a video attribute of the source video data; and
   encapsulating, by the server, the video bitstream or the video file
   wherein
   perception attribute information of at least one target object and spatial location information of the at least one target object are subsequently obtained in the video bitstream or the video file, wherein the at least one object comprises the at least one target object; and
   perception rendering is performed on a perception attribute of the at least one target object based on behavior of the human user, the perception attribute information of the at least one target object and the spatial location information of the at least one target object;
   the performance of the perception rendering on the perception attribute of the at least one target object comprises:
   determining a scent strength value of a first target object in the at least one target object at a current location of the human user based on the current location of the human user, spatial location information of the first target object, and a maximum scent strength of the first target object, and
   emitting a scent corresponding to the scent strength value and a scent code of the first target object; or
   determining a touch strength value of a second target object in the at least one target object at a touch point of the human user based on a current location of the touch point of the human user, spatial location information of the second target object, and a maximum tactility strength of the second target object, and
   feeding back tactility perception corresponding to the touch strength value and a tactility code of the second target object to the human user.

2. The method according to claim 1, wherein adding the perception attribute information and the spatial location information to the video bitstream or the video file comprises:
   determining, by the server, a syntax element of a target object in the at least one object, wherein the syntax element is used to indicate perception attribute information of the target object and spatial location information of the target object; and
   encoding, by the server, the syntax element into a coding unit (CU) syntax structure or supplemental enhancement information (SEI) corresponding to the target object, to obtain the video bitstream.

3. The method according to claim 1, wherein adding the perception attribute information and the spatial location information to the video bitstream or the video file comprises:
   determining, by the server, a syntax element of a target object in the at least one object, wherein the syntax element is used to indicate perception attribute information of the target object and spatial location information of the target object; and
   adding, by the server, the syntax element to a media file format or a media presentation description (MPD) of the video file.

4. The method according to claim 1, wherein the spatial location information of the at least one object comprises a distance measurement value between the at least one object and a perception attribute information capture apparatus; and
   the perception attribute information of the at least one object comprises at least one of: a scent code of the at least one object, a maximum scent strength of the at least one object, a tactility code of the at least one object, or a maximum tactility strength of the at least one object, wherein the scent code is used to indicate a type of a scent emitted by the at least one object, and the tactility code is used to indicate a tactility type of the human user when the at least one object is touched.

5. The method according to claim 1, wherein the video bitstream or the video file comprises a flag bit used to indicate whether the perception attribute information of the at least one object needs to be parsed.

6. The method according to claim 5, wherein
   the flag bit is comprised in a header structure of the video bitstream;
   the flag bit is comprised in the perception attribute information of the video bitstream; or
   the flag bit is comprised in a box of the video file.

7. A method of video processing, comprising:
   obtaining, by a terminal device, a video bitstream or a video file, wherein the video bitstream or the video file carries perception attribute information of at least one object and spatial location information of the at least one object, the perception attribute information indicates a human body perception attribute of the at least one object and is used to indicate a property presented when the at least one object is perceived by a human user, the spatial location information is used to indicate a spatial location of the at least one object, the video bitstream is generated after source video data is encoded, and the video file is used to describe a video attribute of the source video data;
   obtaining, by the terminal device, perception attribute information of at least one target object and spatial location information of the at least one target object in the video bitstream or the video file, wherein the at least one object comprises the at least one target object; and
   performing, by the terminal device, perception rendering on a perception attribute of the at least one target object based on behavior of the human user, the perception attribute information of the at least one target object and the spatial location information of the at least one target object;

wherein performing the perception rendering on the perception attribute of the at least one target object comprises:

determining, by the terminal device, a scent strength value of a first target object in the at least one target object at a current location of the human user based on the current location of the human user, spatial location information of the first target object, and a maximum scent strength of the first target object, and emitting, by the terminal device, a scent corresponding to the scent strength value and a scent code of the first target object; or determining, by the terminal device, a touch strength value of a second target object in the at least one target object at a touch point of the human user based on a current location of the touch point of the human user, spatial location information of the second target object, and a maximum tactility strength of the second target object, and feeding back, by the terminal device, tactility perception corresponding to the touch strength value and a tactility code of the second target object to the human user.

8. The method according to claim 7, wherein obtaining the perception attribute information of the at least one target object and the spatial location information of the at least one target object in the video bitstream or the video file comprises:

decoding, by the terminal device, the video bitstream, and obtaining the perception attribute information of the at least one target object and the spatial location information of the at least one target object from a coding unit (CU) syntax structure or supplemental enhancement information (SEI) corresponding to the at least one target object; or decapsulating, by the terminal device, the video file, and obtaining the perception attribute information of the at least one target object and the spatial location information of the at least one target object from a media file format or a media presentation description (MPD) of the video file.

9. The method according to claim 7, wherein the spatial location information of the at least one object comprises a distance measurement value between the at least one object and a perception attribute information capture apparatus; and the perception attribute information of the at least one object comprises at least one of: a scent code of the at least one object, a maximum scent strength of the at least one object, a tactility code of the at least one object, and a maximum tactility strength of the at least one object, wherein the scent code is used to indicate a type of a scent emitted by the at least one object, and the tactility code is used to indicate a tactility type of the human user when the at least one object is touched.

10. The method according to claim 7, wherein the video bitstream or the video file comprises a flag bit used to indicate whether the perception attribute information of the at least one object needs to be parsed; and further comprising: before the terminal device obtains the perception attribute information of the at least one target object within a current visual angle of the human user based on a visual angle of the human user and the video bitstream or the video file, determining, by the terminal device based on the flag bit, whether the perception attribute information of the at least one object needs to be parsed.

11. The method according to claim 10, wherein the flag bit is comprised in a header structure of the video bitstream;

the flag bit is comprised in the perception attribute information of the video bitstream; or the flag bit is comprised in a box of the video file.

12. A video processing apparatus, comprising:

a processor executing instructions stored in a memory to:

obtain source video data;

determine at least one object having perception attribute information to be encoded in the source video data, wherein the perception attribute information indicates a human body perception attribute of the at least one object and is used to indicate a property presented when the at least one object is perceived by a human user;

obtain the perception attribute information of the at least one object and spatial location information of the at least one object, wherein the spatial location information is used to indicate a spatial location of the at least one object;

add the perception attribute information and the spatial location information to a video bitstream generated after the source video data is encoded or a video file of the source video data, wherein the video file is used to describe a video attribute of the source video data; and encapsulate the video bitstream or the video file;

wherein perception attribute information of at least one target object and spatial location information of the at least one target object are subsequently obtained in the video bitstream or the video file, wherein the at least one object comprises the at least one target object; and perception rendering is performed on a perception attribute of the at least one target object based on behavior of the human user, the perception attribute information of the at least one target object and the spatial location information of the at least one target object;

the performance of the perception rendering on the perception attribute of the at least one target object comprises:

determining a scent strength value of a first target object in the at least one target object at a current location of the human user based on the current location of the human user, spatial location information of the first target object, and a maximum scent strength of the first target object, and emitting a scent corresponding to the scent strength value and a scent code of the first target object; or determining a touch strength value of a second target object in the at least one target object at a touch point of the human user based on a current location of the touch point of the human user, spatial location information of the second target object, and a maximum tactility strength of the second target object, and feeding back tactility perception corresponding to the touch strength value and a tactility code of the second target object to the human user.

13. The video processing apparatus according to claim 12, wherein to add the perception attribute information and the spatial location information to the video bitstream or the video file, the processor executing instructions stored in the memory is to:

determine a syntax element of a target object in the at least one object, wherein the syntax element is used to indicate perception attribute information of the target object and spatial location information of the target object; and encode the syntax element into a coding unit (CU) syntax structure or supplemental enhancement information (SEI) corresponding to the target object, to obtain the video bitstream.

14. The video processing apparatus according to claim 12, wherein to add the perception attribute information and the spatial location information to the video bitstream or the video file, the processor executing instructions stored in the memory is to:

determine a syntax element of a target object in the at least one object, wherein the syntax element is used to indicate perception attribute information of the target object and spatial location information of the target object; and add the syntax element to a media file format or a media presentation description (MPD) of the video file.

15. The video processing apparatus according to claim 12, wherein the spatial location information of the at least one object comprises a distance measurement value between the at least one object and a perception attribute information capture apparatus; and the perception attribute information of the at least one object comprises at least one of: a scent code of the at least one object, a maximum scent strength of the at least one object, a tactility code of the at least one object, or a maximum tactility strength of the at least one object, wherein the scent code is used to indicate a type of a scent emitted by the at least one object, and the tactility code is used to indicate a tactility type of the human user when the at least one object is touched.

16. The video processing apparatus according to claim 12, wherein the video bitstream or the video file comprises a flag bit used to indicate whether the perception attribute information of the at least one object needs to be parsed.

17. The video processing apparatus according to claim 16, wherein the flag bit is comprised in a header structure of the video bitstream;

the flag bit is comprised in the perception attribute information of the video bitstream; or the flag bit is comprised in a box of the video file.

18. A video processing apparatus, comprising:

a processor executing instructions stored in a memory to:

obtain a video bitstream or a video file, wherein the video bitstream or the video file carries perception attribute information of at least one object and spatial location information of the at least one object, the perception attribute information indicates a human body perception attribute of the at least one object and is used to indicate a property presented when the at least one object is perceived by a human user, the spatial location information is used to indicate a spatial location of the at least one object, the video bitstream is generated after source video data is encoded, and the video file is used to describe a video attribute of the source video data;

obtain perception attribute information of at least one target object and spatial location information of the at least one target object in the video bitstream or the video file, wherein the at least one object comprises the at least one target object; and perform perception rendering on a perception attribute of the at least one target object based on behavior of the human user, the perception attribute information of the at least one target object and the spatial location information of the at least one target object;

wherein the processor executing the instructions stored in the memory to perform the perception rendering on the perception attribute of the at least one target object comprises the processor executing the instructions stored in the memory to:

determine a scent strength value of a first target object in the at least one target object at a current location of the human user based on the current location of the human user, spatial location information of the first target object, and a maximum scent strength of the first target object, and emit a scent corresponding to the scent strength value and a scent code of the first target object; or determine a touch strength value of a second target object in the at least one target object at a touch point of the human user based on a current location of the touch point of the human user, spatial location information of the second target object, and a maximum tactility strength of the second target object, and feed back tactility perception corresponding to the touch strength value and a tactility code of the second target object to the human user.

19. The video processing apparatus according to claim 18, wherein to obtain the perception attribute information of the at least one target object and the spatial location information of the at least one target object in the video bitstream or the video file, the processor executing instructions stored in the memory is to:

decode the video bitstream, and obtain the perception attribute information of the at least one target object and the spatial location information of the at least one target object from a coding unit (CU) syntax structure or supplemental enhancement information (SEI) corresponding to the at least one target object; or decapsulate the video file, and obtain the perception attribute information of the at least one target object and the spatial location information of the at least one target object from a media file format or a media presentation description (MPD) of the video file.

20. The video processing apparatus according to claim 18, wherein the spatial location information of the at least one object comprises a distance measurement value between the at least one object and a perception attribute information capture apparatus; and the perception attribute information of the at least one object comprises at least one of: a scent code of the at least one object, a maximum scent strength of the at least one object, a tactility code of the at least one object, or a maximum tactility strength of the at least one object, wherein the scent code is used to indicate a type of a scent emitted by the at least one object, and the tactility code is used to indicate a tactility type of the human user when the at least one object is touched.

21. The apparatus according to claim 18, wherein the video bitstream or the video file comprises a flag bit used to indicate whether the perception attribute information of the at least one object needs to be parsed; and before obtaining the perception attribute information of the at least one target object within a current visual angle of the human user based on a visual angle of the human user and the video bitstream or the video file, the processor executing instructions stored in the memory is further to determine, based on the flag bit, whether the perception attribute information of the at least one object needs to be parsed.

22. The video processing apparatus according to claim 21, wherein
> the flag bit is comprised in a header structure of the video bitstream;
> the flag bit is comprised in the perception attribute information of the video bitstream; or
> the flag bit is comprised in a box of the video file.

23. A non-transitory computer-readable medium configured to store a computer program, wherein the computer program comprises instructions used for performing the method according to claim 1.

24. A chip, comprising: a processor configured to read instructions stored in a memory, and when the processor executes the instructions, the chip is enabled to perform the method according to claim 1.

* * * * *